(12) United States Patent
Baba et al.

(10) Patent No.: US 8,424,771 B2
(45) Date of Patent: Apr. 23, 2013

(54) RFID TAG

(75) Inventors: Shunji Baba, Kawasaki (JP); Noritsugu Ozaki, Kawasaki (JP); Manabu Kai, Kawasaki (JP); Satoru Nogami, Inagi (JP); Yoshiyasu Sugimura, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 318 days.

(21) Appl. No.: 12/824,309

(22) Filed: Jun. 28, 2010

(65) Prior Publication Data

US 2011/0001608 A1 Jan. 6, 2011

(30) Foreign Application Priority Data

Jul. 1, 2009 (JP) ................... 2009-157004

(51) Int. Cl.
*G06K 19/06* (2006.01)
(52) U.S. Cl.
USPC .......................................... 235/492; 235/387
(58) Field of Classification Search .................. 235/492, 235/487
See application file for complete search history.

(56) References Cited

U.S. PATENT DOCUMENTS

| 2004/0074975 | A1* | 4/2004 | Gundlach et al. ............ 235/492 |
| 2006/0043199 | A1 | 3/2006 | Baba et al. |
| 2008/0203173 | A1 | 8/2008 | Baba |
| 2008/0252425 | A1 | 10/2008 | Okegawa et al. |
| 2008/0314993 | A1 | 12/2008 | Baba et al. |
| 2009/0021352 | A1 | 1/2009 | Kataya et al. |

FOREIGN PATENT DOCUMENTS

| CN | 101251903 A | 8/2008 |
| CN | 101366148 A | 2/2009 |
| JP | 2000-113144 | 4/2000 |
| JP | 2001-143037 | 5/2001 |
| JP | 2005-229098 | 8/2005 |
| JP | 2005-277921 A | 10/2005 |
| JP | 2008-204346 A | 9/2008 |
| WO | 2008/099309 A1 | 8/2008 |
| WO | WO 2009/011144 A1 | 1/2009 |

OTHER PUBLICATIONS

European Search Report application No. 10167363 dated Oct. 22, 2010.
Korean Office Action application No. 10-2010-0061113 dated Sep. 26, 2011.
Office Action issued in the corresponding CN Application No. 201010215019.X, dated Jul. 3, 2012.
Office Action issued in the corresponding CN Application No. 2012062800830530, dated Jul. 3, 2012.
Japanese Office Action dated Dec. 11, 2012 corresponding to Japanese Patent Application No. 2009-157004 and English translation thereof.

* cited by examiner

*Primary Examiner* — Karl D Frech
(74) *Attorney, Agent, or Firm* — Squire Sanders (US) LLP

(57) ABSTRACT

An RFID tag includes a semiconductor package, a substrate and an antenna pattern. The semiconductor package includes a semiconductor chip encapsulated therein and a plurality of connection terminals thereon. The plurality of connection terminals includes signal terminals and dummy terminals. The semiconductor package is mounted on the substrate. The antenna pattern is formed on the substrate and is electrically connected to the signal terminals. The antenna pattern is extended so as to overlap with at least a part of a bottom region of the semiconductor package.

16 Claims, 24 Drawing Sheets

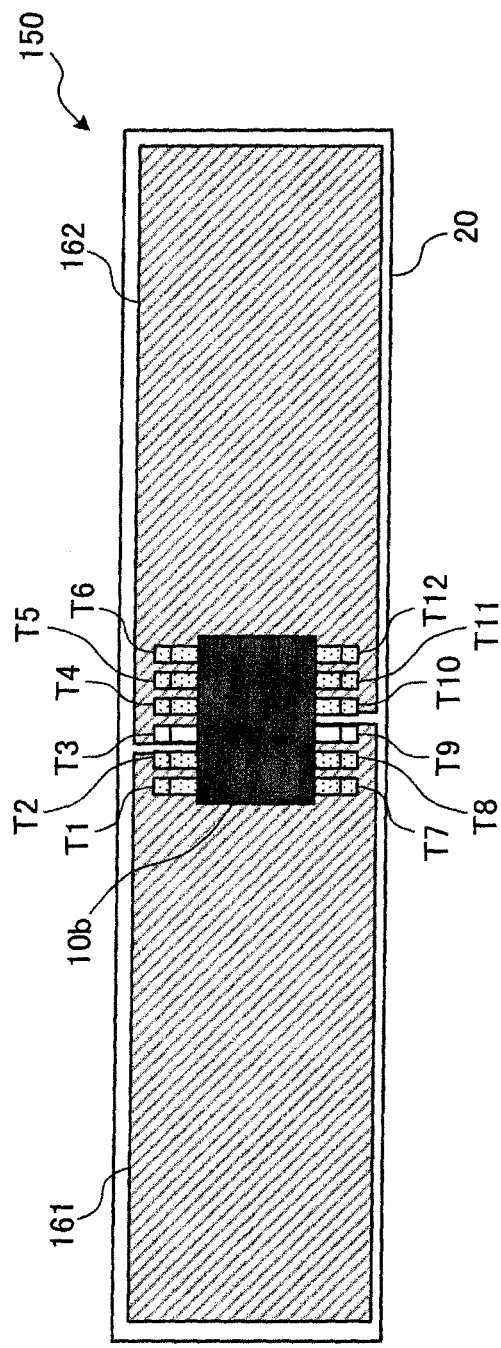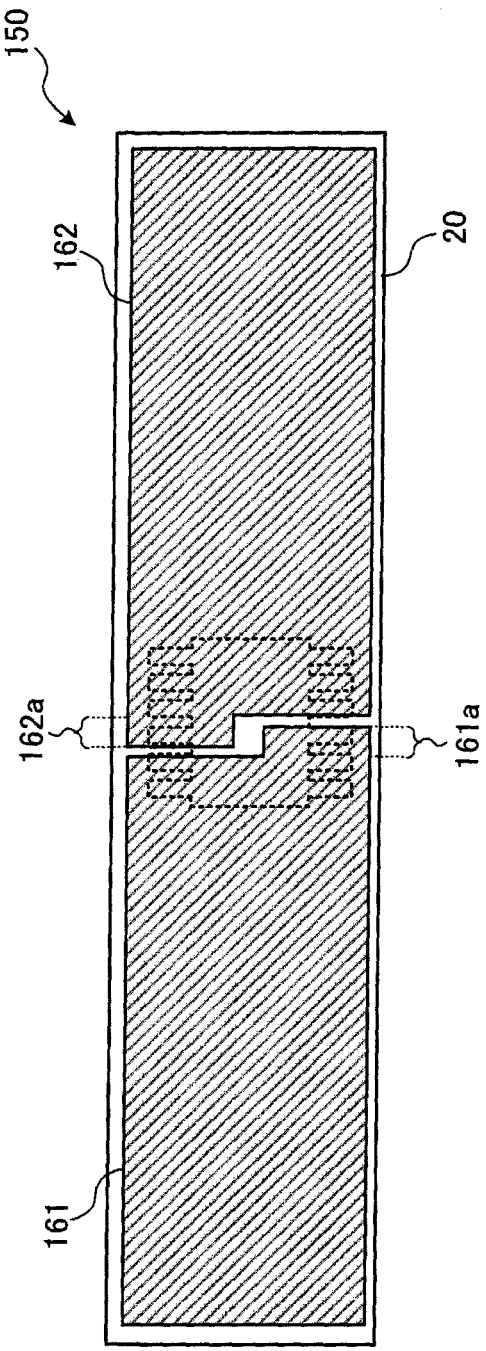
FIG. 6A
FIG. 6B

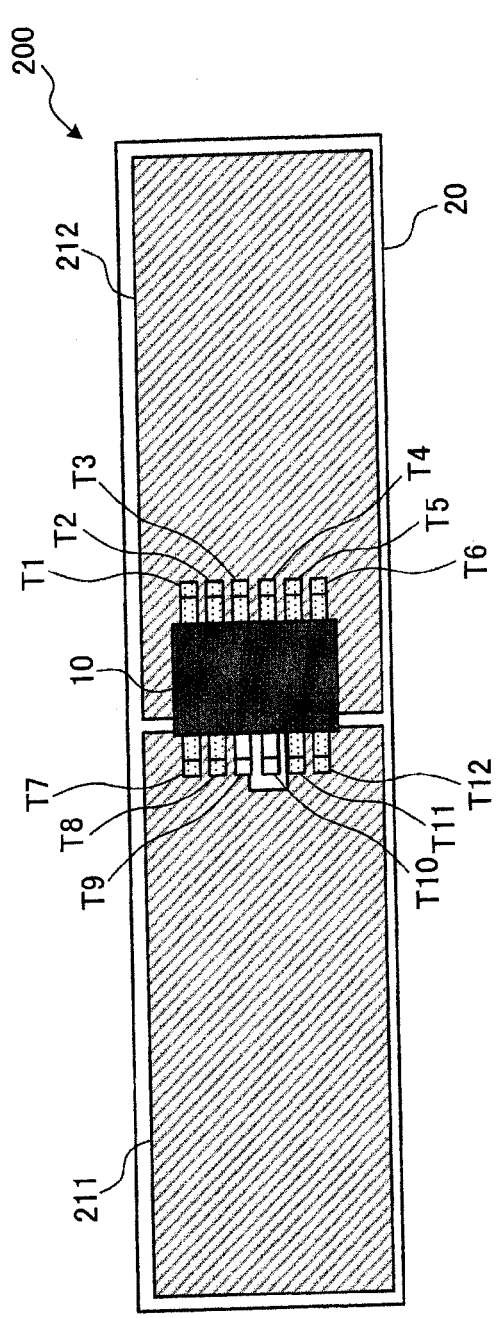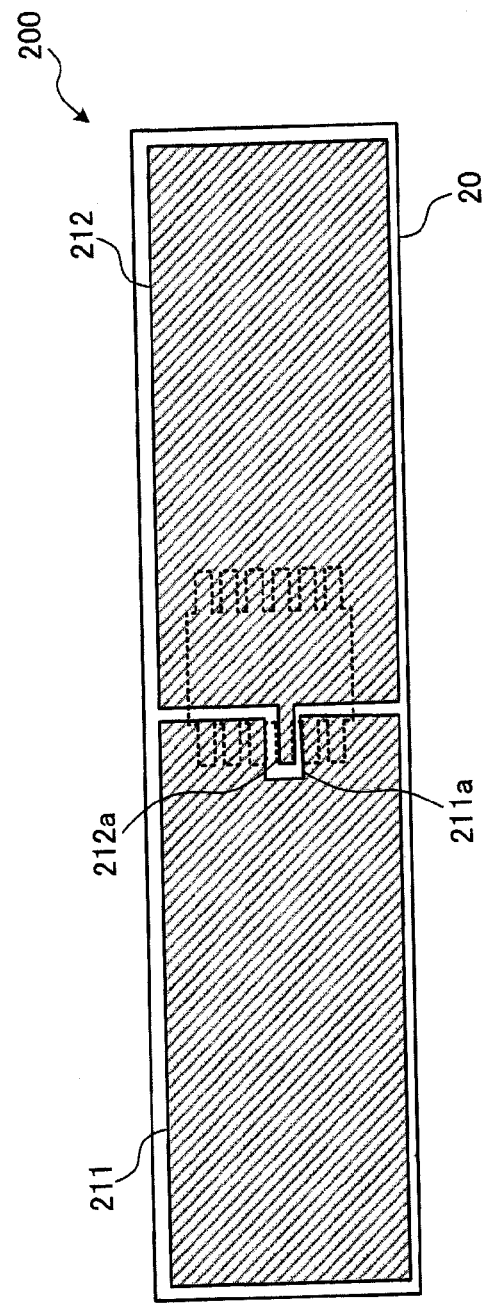
FIG. 7A
FIG. 7B

PLAN VIEW

FRONT VIEW

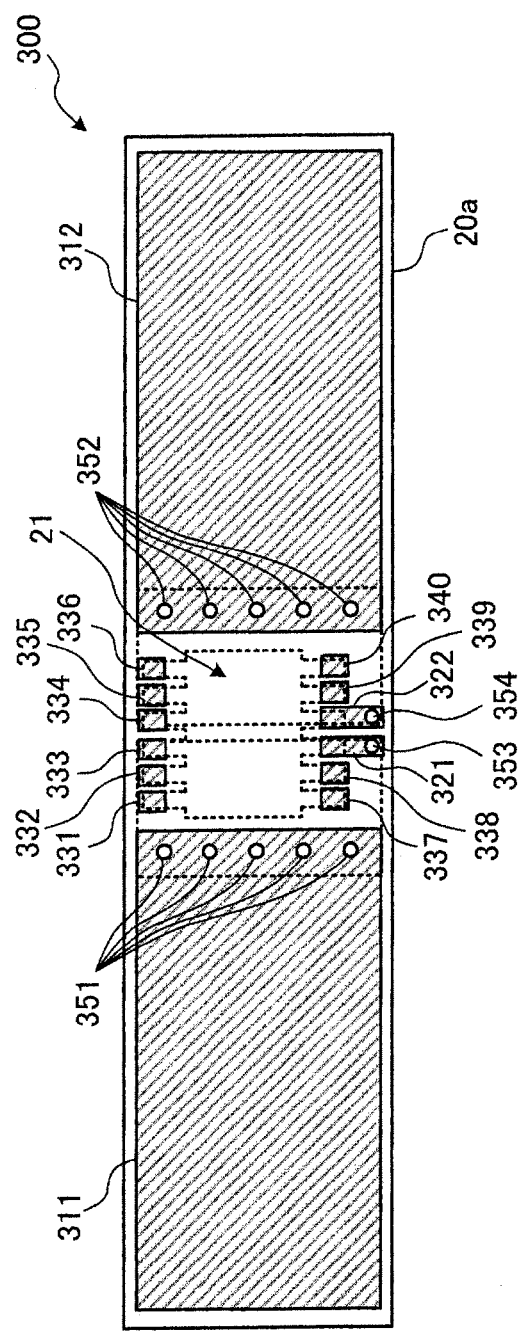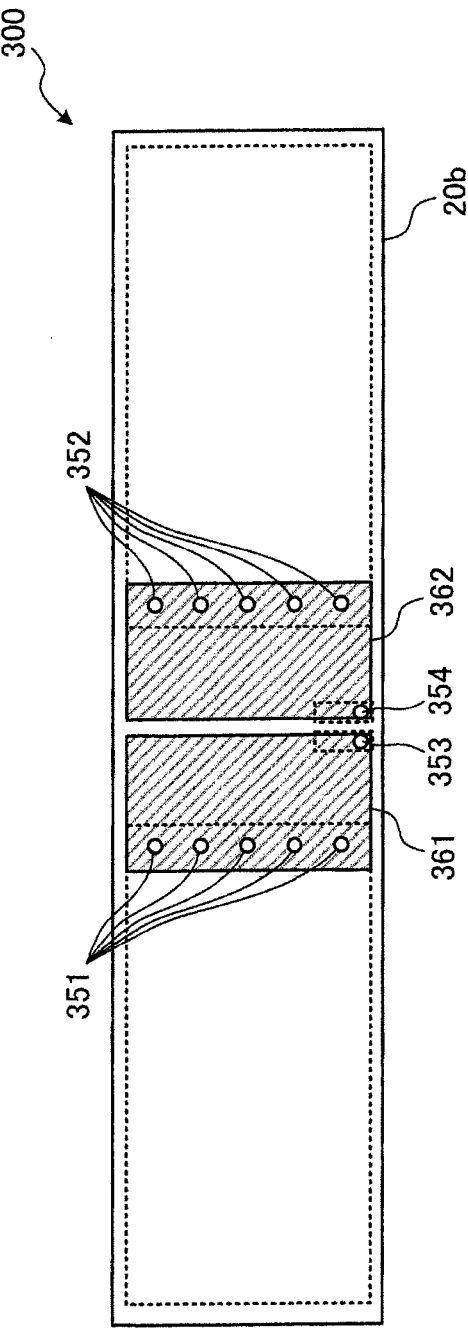

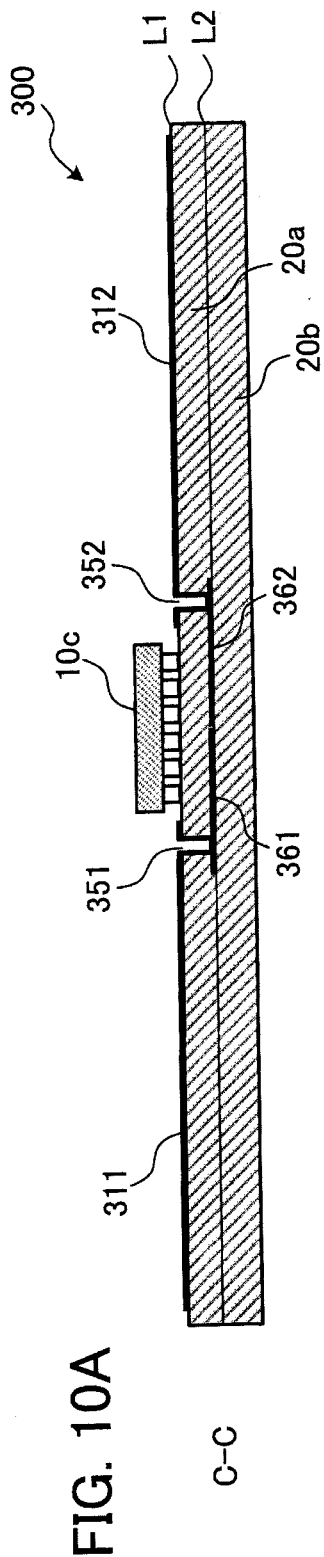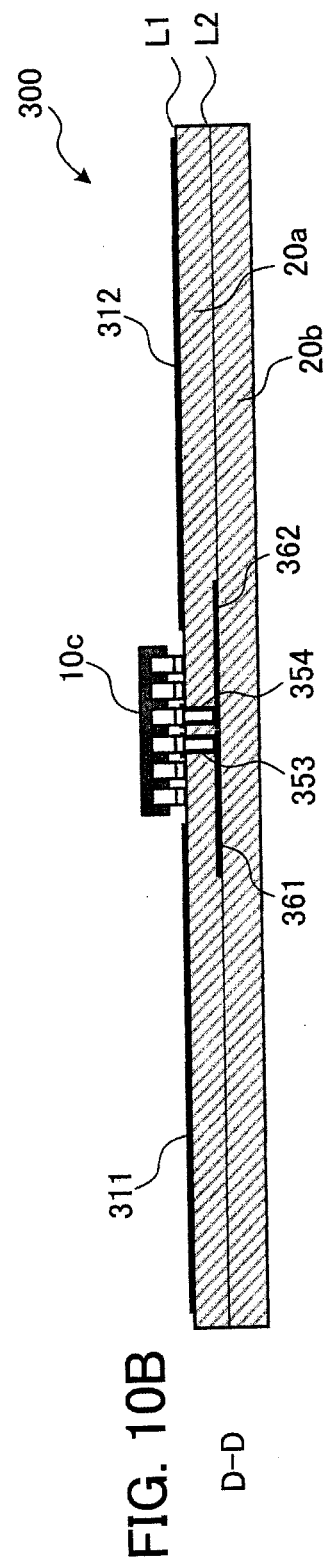

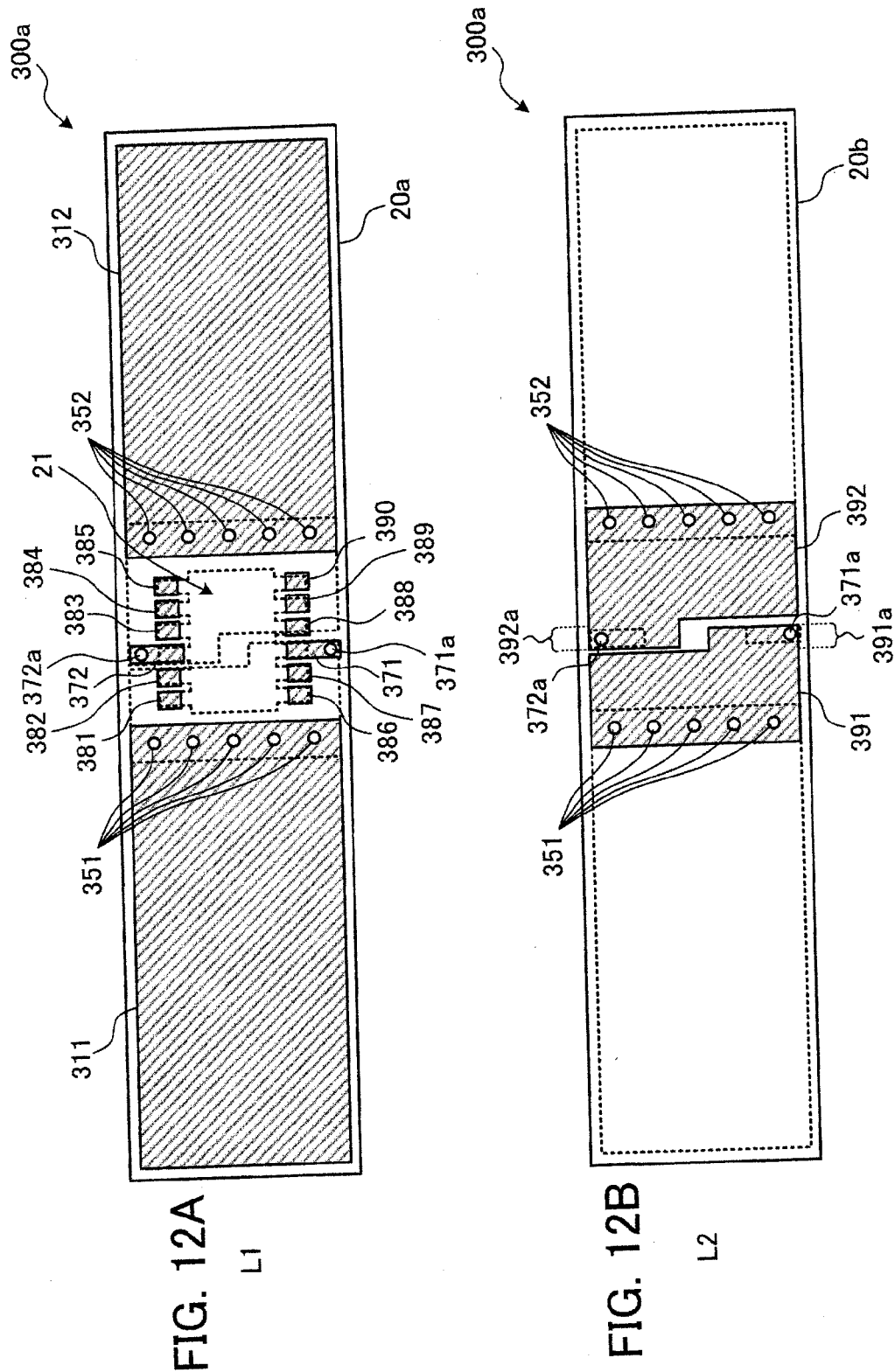

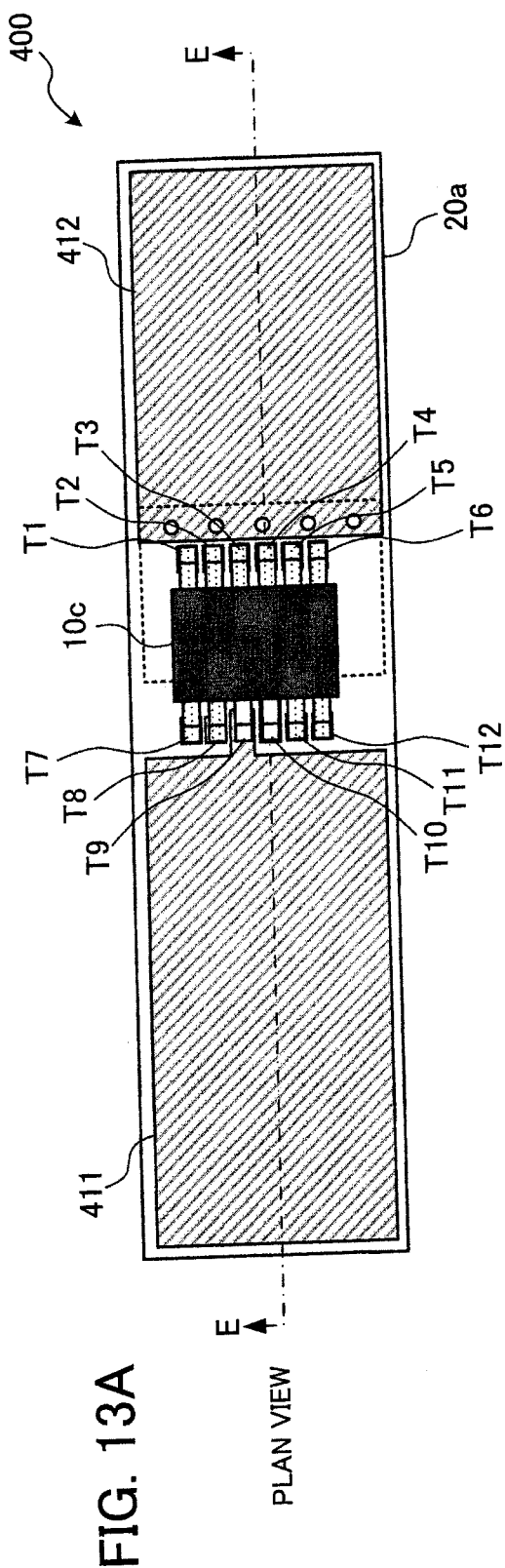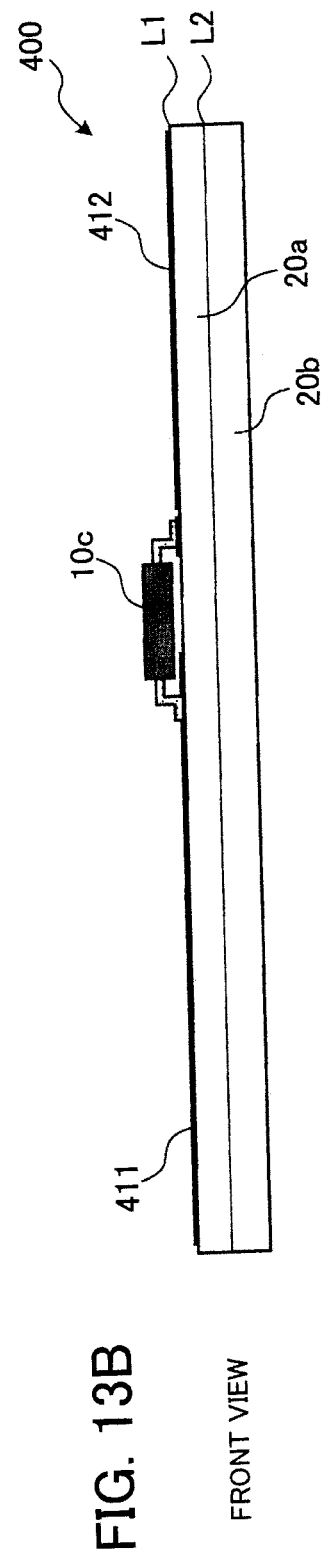
FIG. 13A PLAN VIEW
FIG. 13B FRONT VIEW

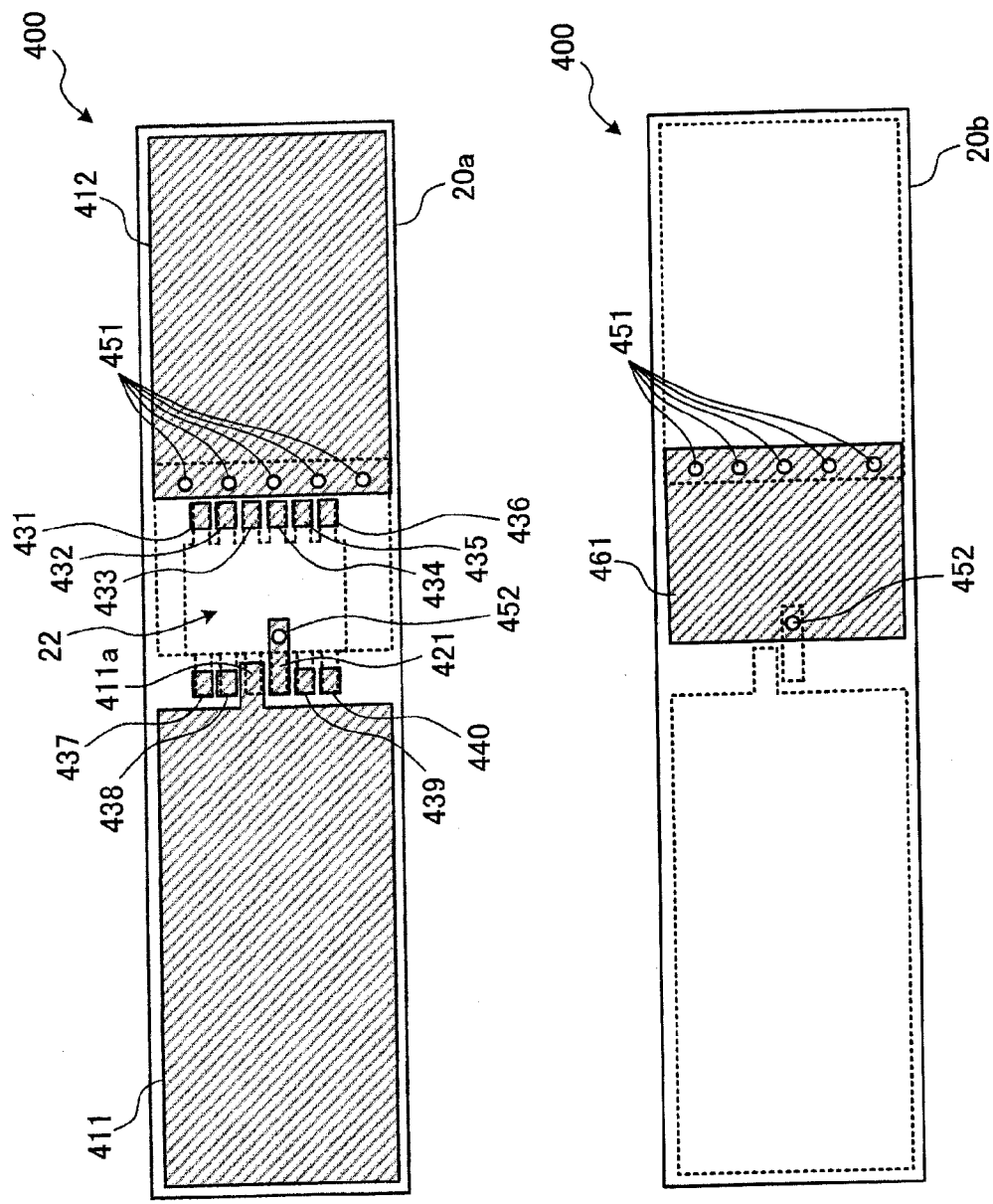

PLAN VIEW

FRONT VIEW

BOTTOM VIEW

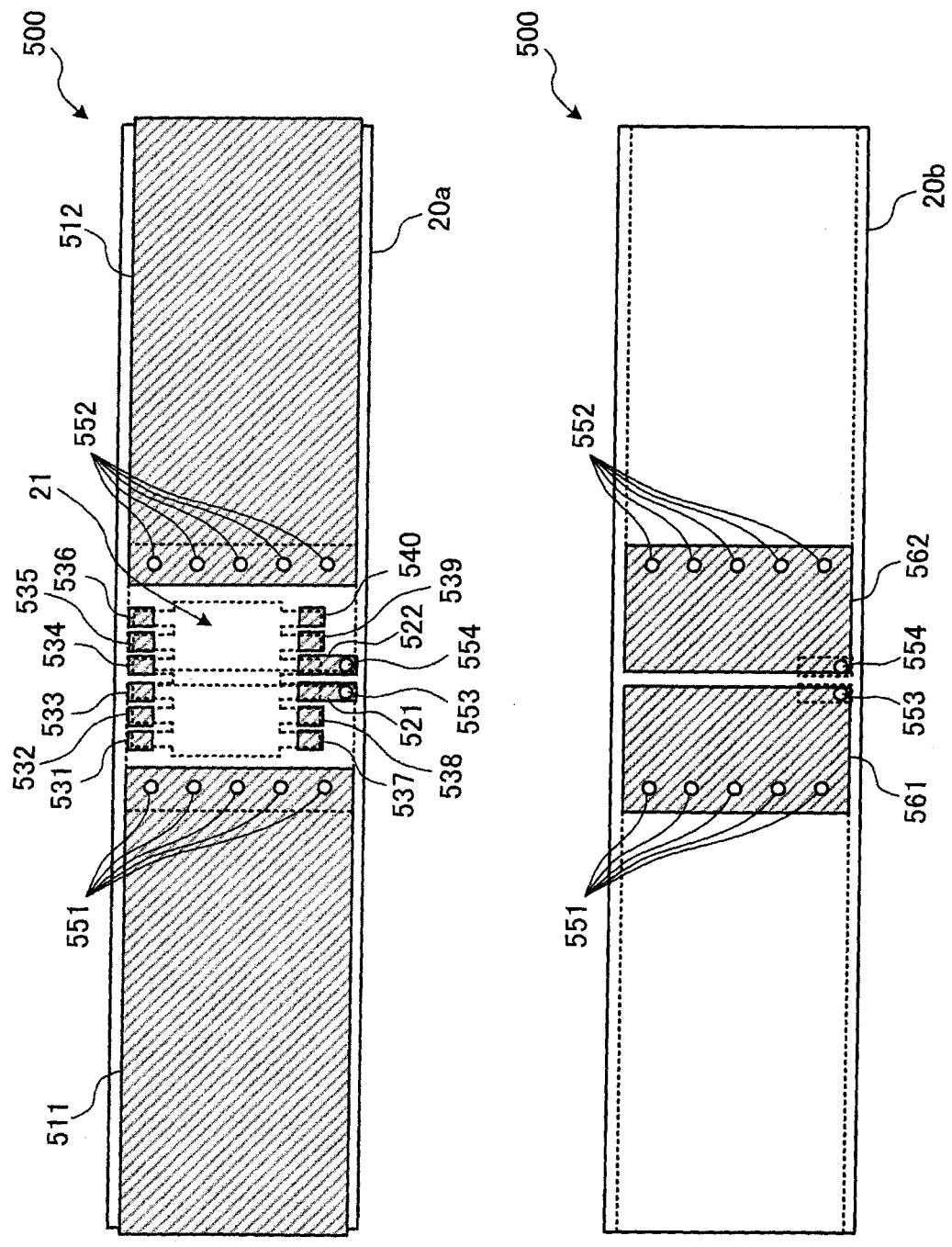

F-F

G-G

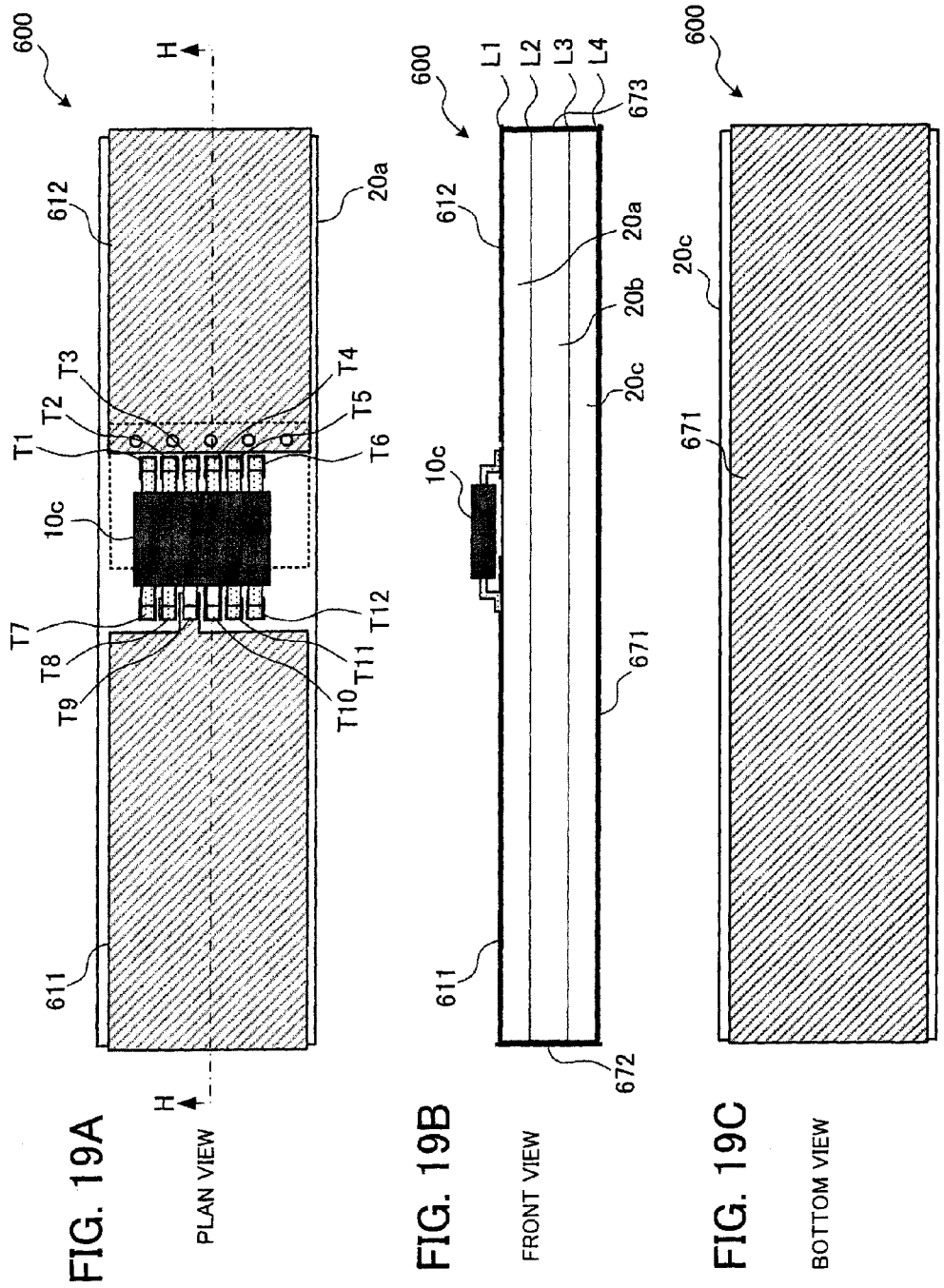

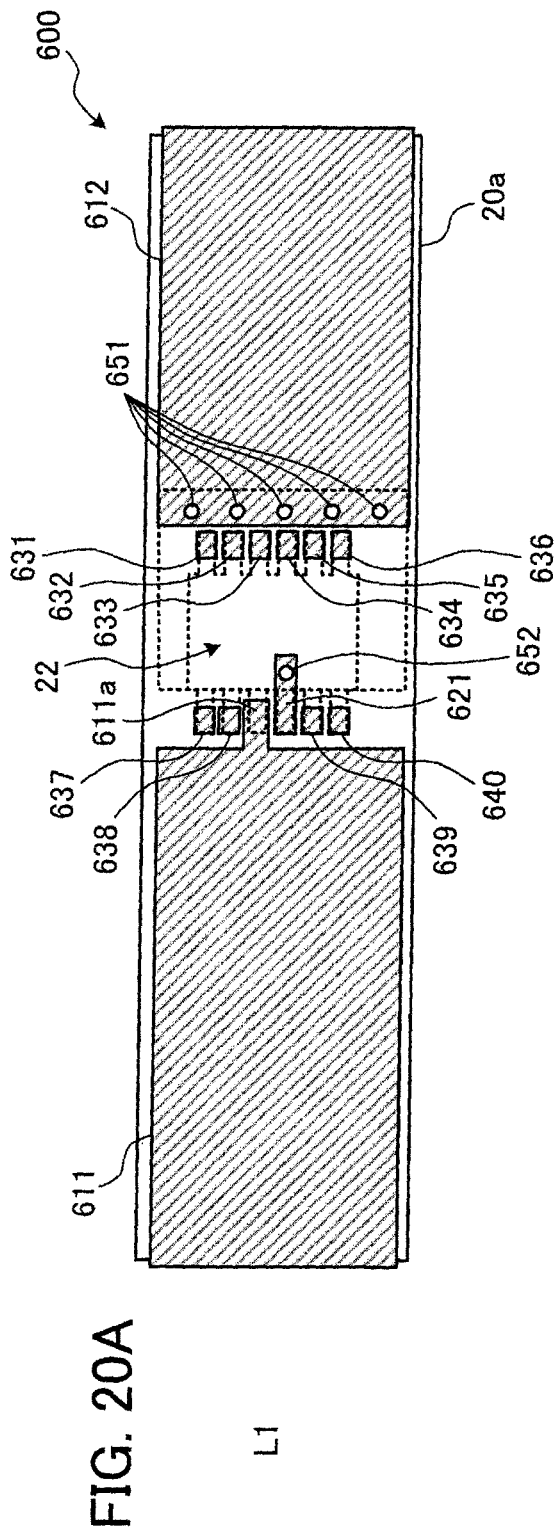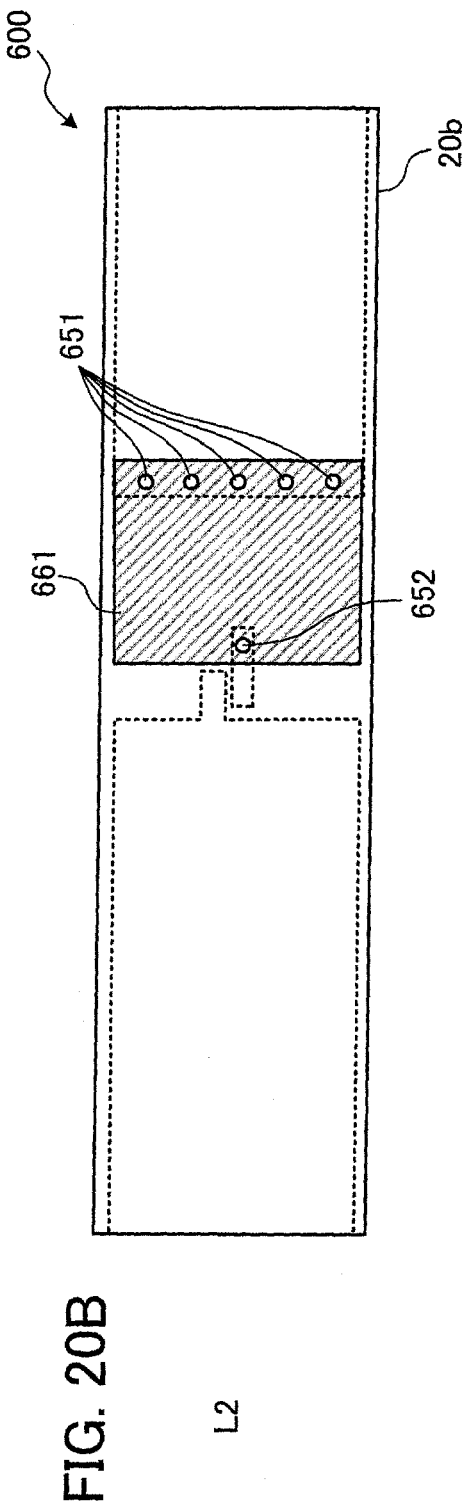

PLAN VIEW

FRONT VIEW

BOTTOM VIEW

RFID TAG

CROSS-REFERENCE TO RELATED APPLICATION(S)

This application is based upon and claims the benefit of priority of the prior Japanese Patent Application No. 2009-157004, filed on Jul. 1, 2009, the entire contents of which are incorporated herein by reference.

FIELD

The embodiment discussed herein is related to an RFID tag.

BACKGROUND

In recent years, an integrated circuit (IC) chip capable of delivering information to an external device in a non-contact way is taken notice of. For example, it is considered that identification (ID) information is stored in the above-described non-contact type IC chip to be used for identification or management of commodities. The non-contact type IC chip used for the above-described purposes is called a radio frequency ID (RFID) tag. The RFID tag includes one capable of writing data in a memory of the non-contact type IC chip and one capable of the execution of various types of processes using received data or stored data such as an authentication process between the RFID tag and an external device.

To the non-contact type IC chip, an antenna for communication with the external devices is connected. When using a bare chip mounting technology, a non-contact type IC chip is mounted on a resin substrate having formed thereon an antenna to connect terminals of the non-contact type IC chip and the antenna in many cases (see, e.g., Japanese Laid-open Patent Publication No. 2001-143037). In an IC card using a coiled antenna, the non-contact type IC chip is mounted on the IC card so as to be arranged over the coiled antenna to connect both ends of the coiled antenna and the terminals of the non-contact type IC chip in some cases (see, e.g., Japanese Laid-open Patent Publication No. 2000-113144). Further, as a wireless IC tag similarly using a coiled antenna, there is used one in which the non-contact type IC chip and the coiled antenna are directly laminated together (see, e.g., Japanese Laid-open Patent Publication No. 2005-229098).

Meanwhile, a non-contact IC chip for an RFID tag is also used while encapsulated in a surface mount device (SMD) in recent days. When provided as an SMD package, the non-contact IC chip exerts, for example, the effect of improving reliability of a junction at the time of connecting it to a substrate having formed thereon an antenna.

As described above, when the non-contact IC chip is encapsulated in the SMD package, a plurality of connection terminals are not connected to an antenna in the SMD package in many cases. At this time, for the purpose of preventing the unnecessary connection terminals from being connected to the antenna on a substrate, the antenna is formed on a region except a region having mounted thereon the SMD package in an SMD substrate. However, since a mounting area of the SMD package is larger than that of the non-contact IC chip, there arises a problem that an antenna formation area on the substrate is relatively reduced, and therefore, for example, a communication distance becomes short. For making it possible to have a longer communication distance, a size of the entire RFID tag including the substrate needs to be increased.

SUMMARY

According to one aspect of the present invention, there is provided an RFID tag. This RFID tag includes: a semiconductor package, a substrate and an antenna pattern. The semiconductor package includes a semiconductor chip encapsulated therein and a plurality of connection terminals thereon. The plurality of connection terminals includes signal terminals and dummy terminals. The semiconductor package is mounted on the substrate. The antenna pattern is formed on the substrate and is electrically connected to the signal terminals. The antenna pattern is extended so as to overlap with at least a part of a bottom region of the semiconductor package.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIGS. 1A, 1B, and 1C illustrate a configuration of an RFID tag according to a first embodiment, FIG. 1A is a plan view, FIG. 1B is a front view, and FIG. 1C is a side view;

FIG. 4A illustrates the RFID tag in the case where the IC package is mounted, and FIG. 4B illustrates the RFID tag in the case where the IC package is not mounted;

FIGS. 6A and 6B illustrate a configuration of the RFID tag according to a second embodiment, FIG. 6A illustrates the RFID tag on which the IC package is mounted, and FIG. 6B illustrates the RFID tag on which the IC package is not mounted;

FIGS. 7A and 7B illustrate a configuration of the RFID tag according to a third embodiment, FIG. 7A illustrates the RFID tag on which the IC package is mounted, and FIG. 7B illustrates the RFID tag on which the IC package is not mounted;

FIG. 8A is a plan view, and FIG. 8B is a front view;

FIGS. 9A and 9B illustrate shapes of wiring patterns. FIG. 9A illustrates a wiring pattern of a first wiring layer (L1), and FIG. 9B illustrates a wiring pattern of a second wiring layer (L2);

FIGS. 10A and 10B are cross sectional views of the RFID tag according to the fourth embodiment, FIG. 10A is a cross sectional view of the RFID tag viewed from the direction of the arrows C-C in FIG. 8A, and FIG. 10B is a cross sectional view of the RFID tag viewed from the direction of the arrows D-D in FIG. 8A;

FIGS. 12A and 12B illustrate shapes of the wiring patterns, FIG. 12A illustrates a wiring pattern of the first wiring layer (L1), and FIG. 12B illustrates a wiring pattern of the second wiring layer (L2);

FIGS. 13A and 13B illustrate a configuration of the RFID tag according to a sixth embodiment, FIG. 13A is a plan view, and FIG. 13B is a front view;

FIGS. 14A and 14B illustrate shapes of the wiring patterns, FIG. 14A illustrates the wiring pattern of the first wiring layer (L1), and FIG. 14B illustrates the wiring pattern of the second wiring layer (L2);

Figure 16A:
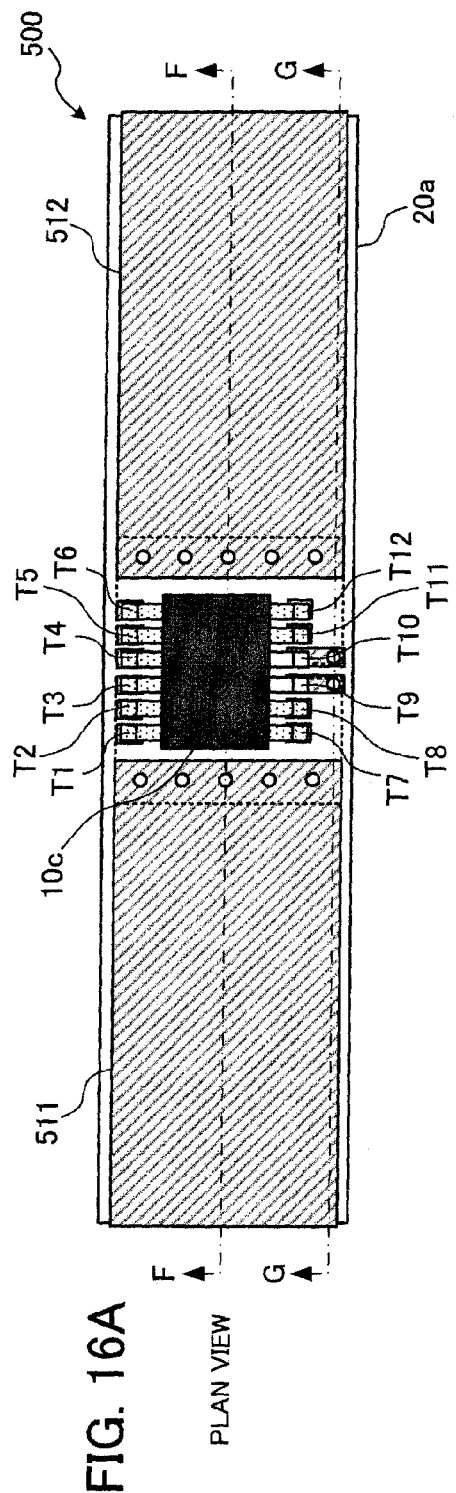
Figure 16B:
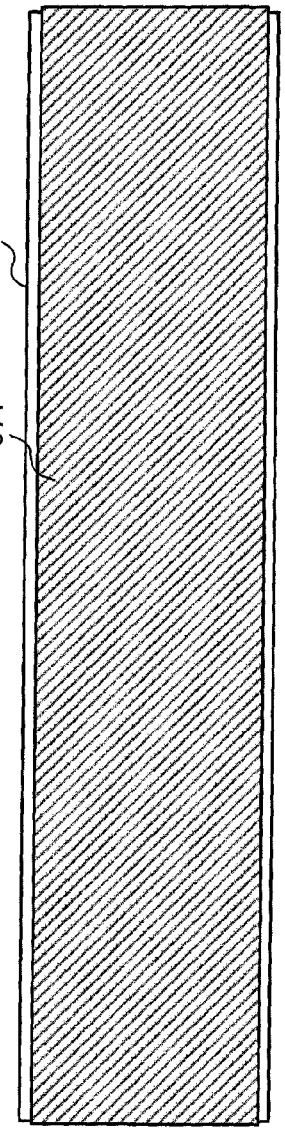
Figure 16C:
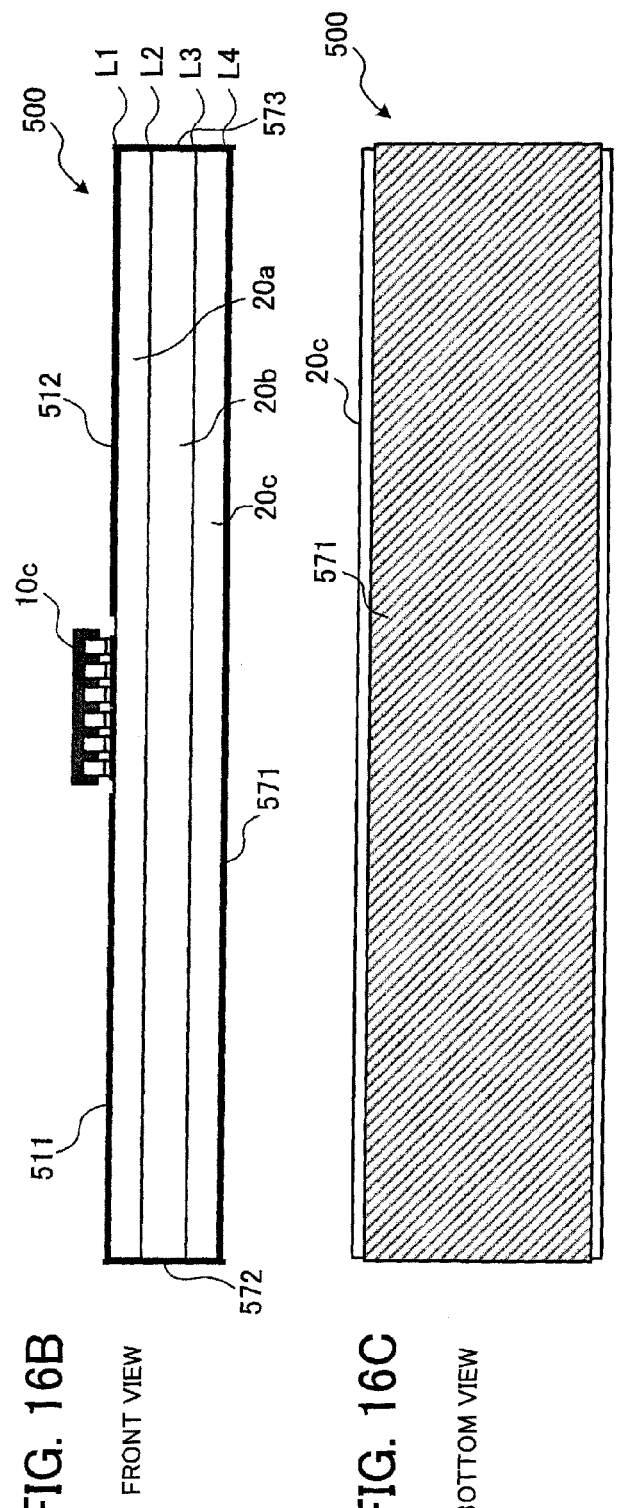
Figure 18A:
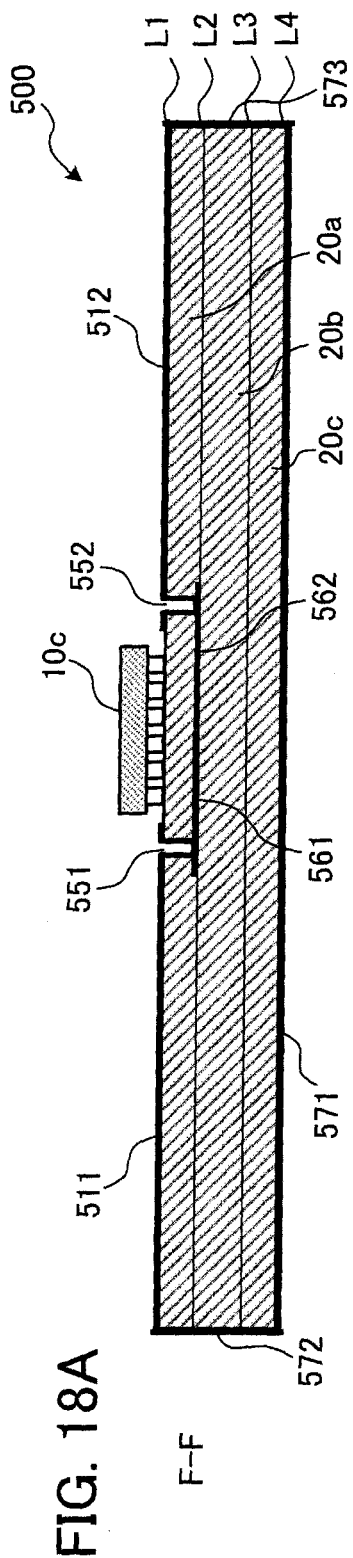
Figure 18B:
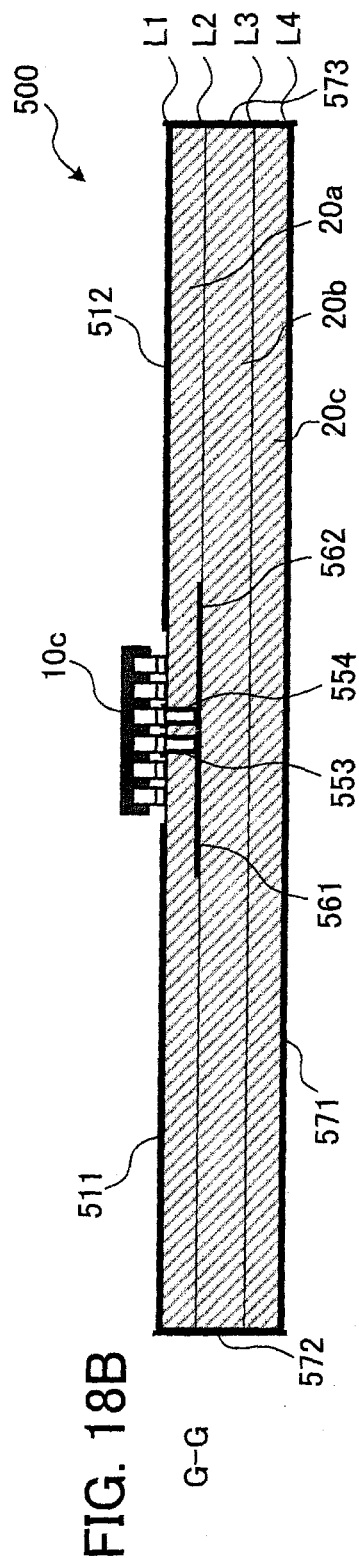
Figure 21:
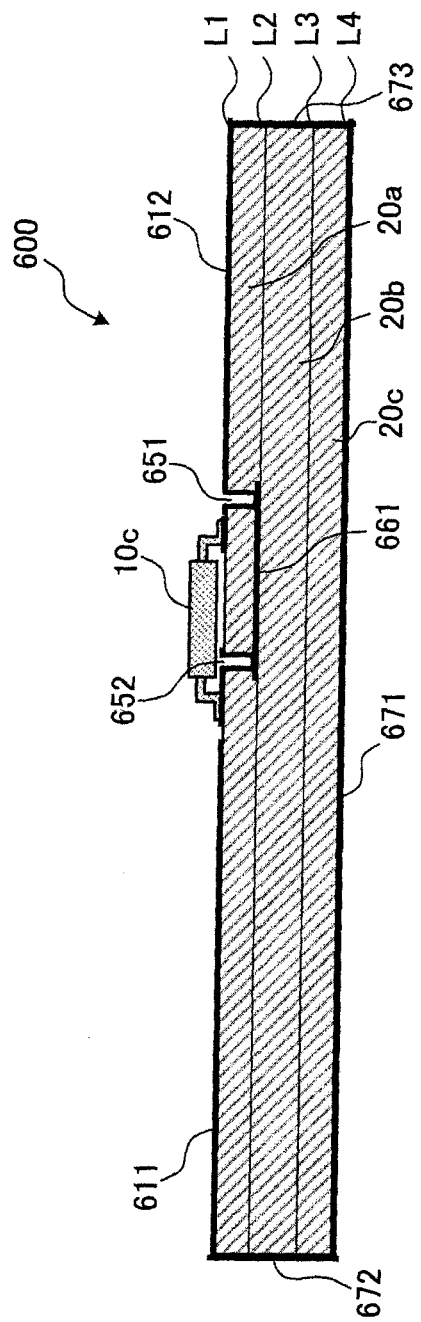
Figure 22A:
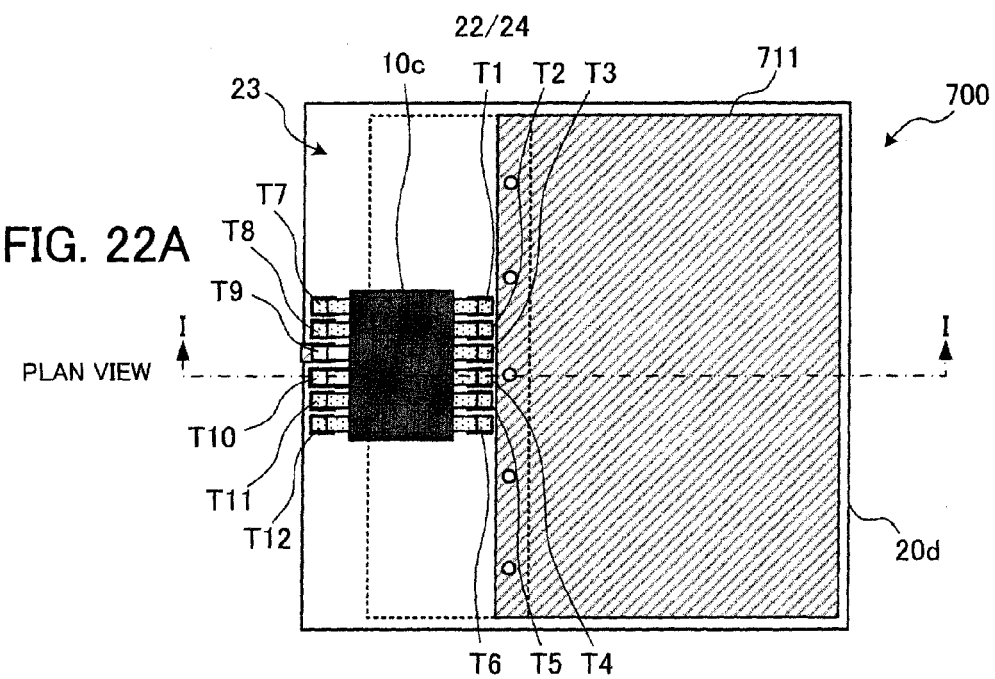
Figure 22B:
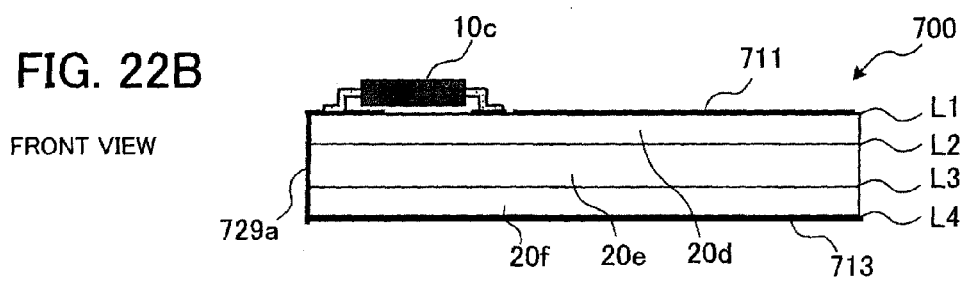
Figure 22C:
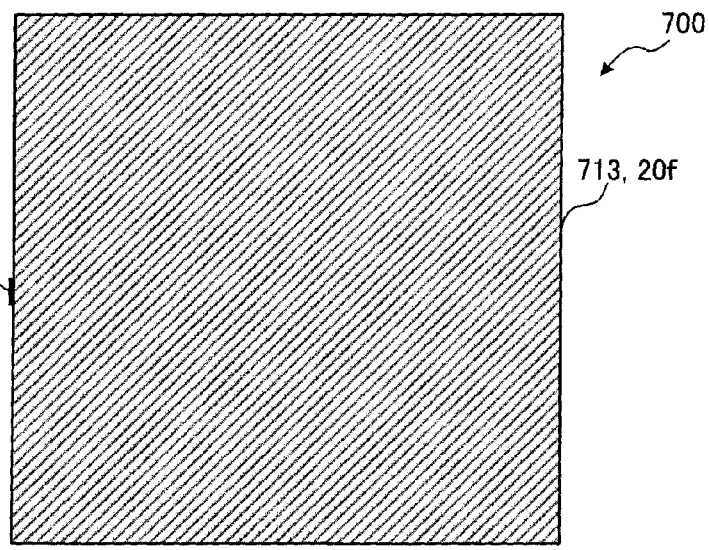
Figure 23A:
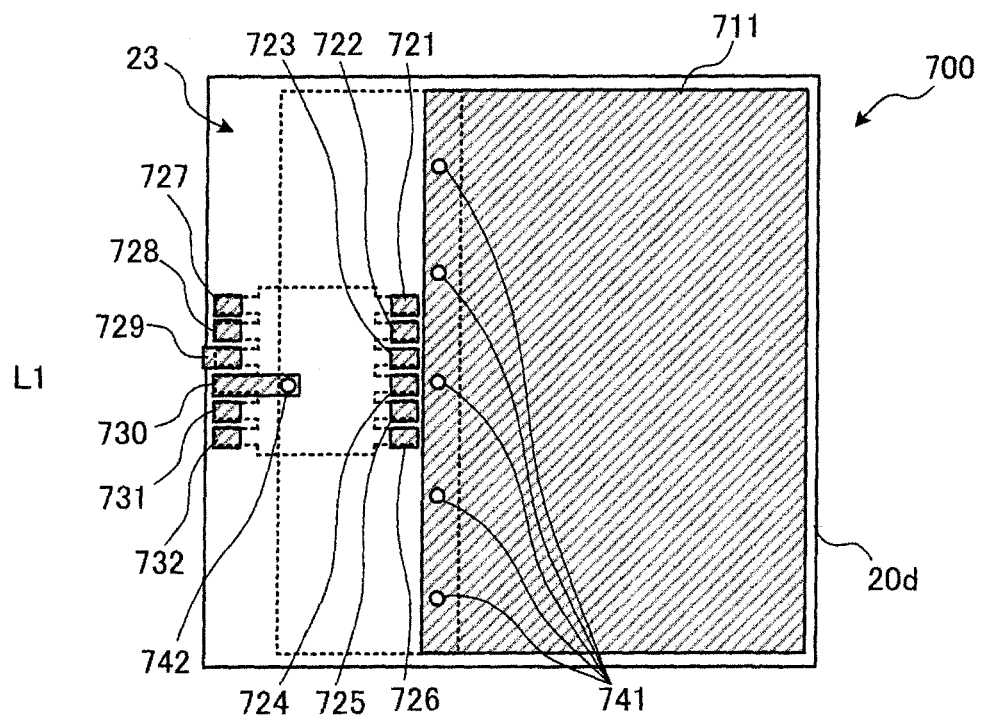
Figure 23B:
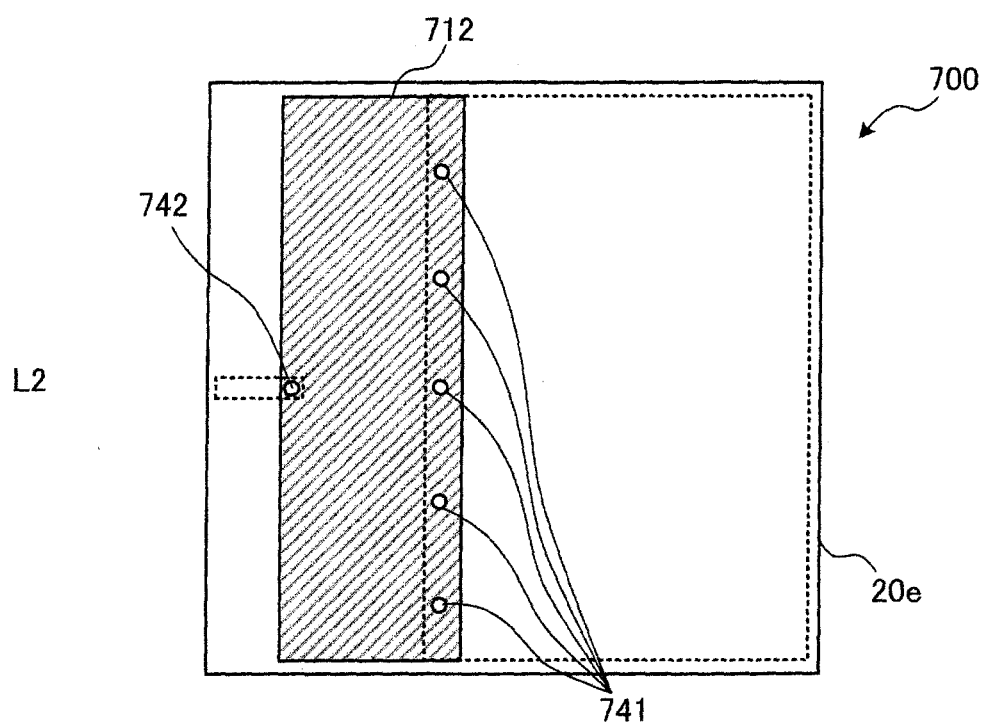
Figure 24:
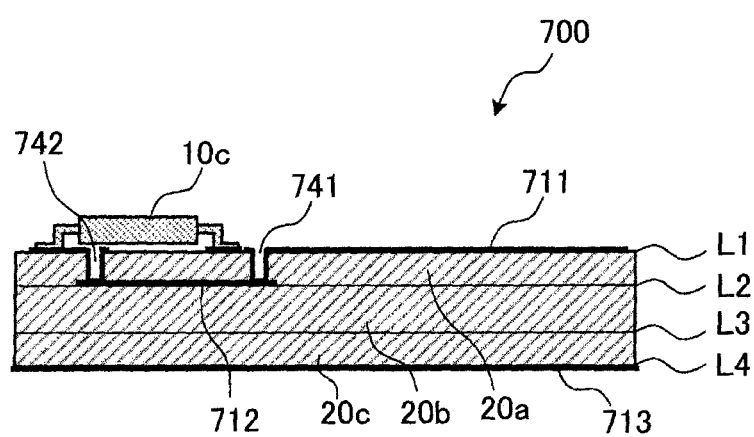

FIGS. 16A, 16B, and 16C illustrate a configuration of the RFID tag according to a seventh embodiment, FIG. 16A is a plan view, FIG. 16B is a front view, and FIG. 16C is a bottom view;

FIGS. 17A and 17B illustrate shapes of the wiring patterns, FIG. 17A illustrates the wiring pattern of the first wiring layer (L1), and FIG. 17B illustrates the wiring pattern of the second wiring layer (L2);

FIGS. 18A and 18B are cross sectional views of the RFID tag according to the seventh embodiment, FIG. 18A is a cross sectional view of the RFID tag viewed from the direction of the arrows F-F in FIG. 16A, and FIG. 18B is a cross sectional view of the RFID tag viewed from the direction of the arrows G-G in FIG. 16A;

FIGS. 19A, 19B, and 19C illustrate a configuration of the RFID tag according to an eighth embodiment, FIG. 19A is a plan view, FIG. 19B is a front view, and FIG. 19C is a bottom view;

FIGS. 20A and 20B illustrate shapes of the wiring patterns, FIG. 20A illustrates the wiring pattern of the first wiring layer (L1), and FIG. 20B illustrates the wiring pattern of the second wiring layer (L2);

FIG. 21 is a cross sectional view of the RFID tag according to the eighth embodiment;

FIGS. 22A, 22B, and 22C illustrate a configuration of the RFID tag according to a ninth embodiment, FIG. 22A is a plan view, FIG. 22B is a front view, and FIG. 22C is a bottom view;

FIGS. 23A and 23B illustrate shapes of the wiring patterns, FIG. 23A illustrates the wiring pattern of the first wiring layer (L1), and FIG. 23B illustrates the wiring pattern of the second wiring layer (L2); and FIG. 24 is a cross sectional view of the RFID tag according to the ninth embodiment.

DESCRIPTION OF EMBODIMENT(S)

Embodiments of the present invention will be described in detail below with reference to the accompanying drawings, wherein like reference numerals refer to like elements throughout.

First Embodiment

Figure 1A:
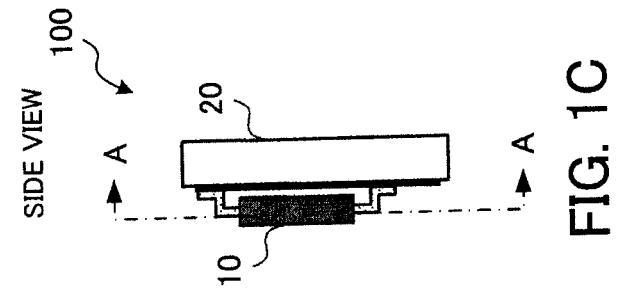
Figure 1B:
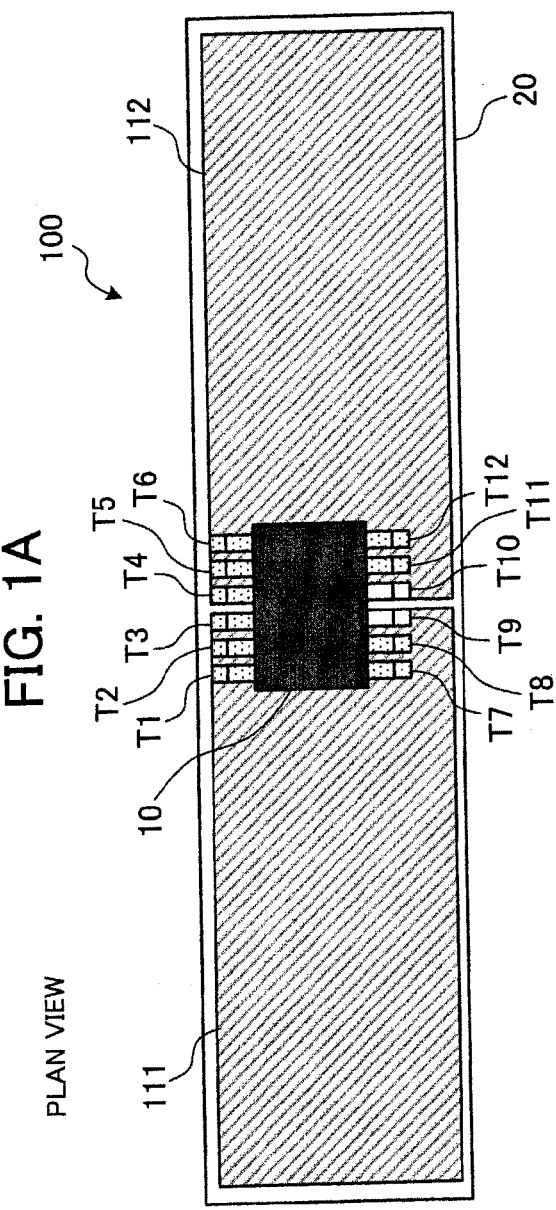
Figure 1C:
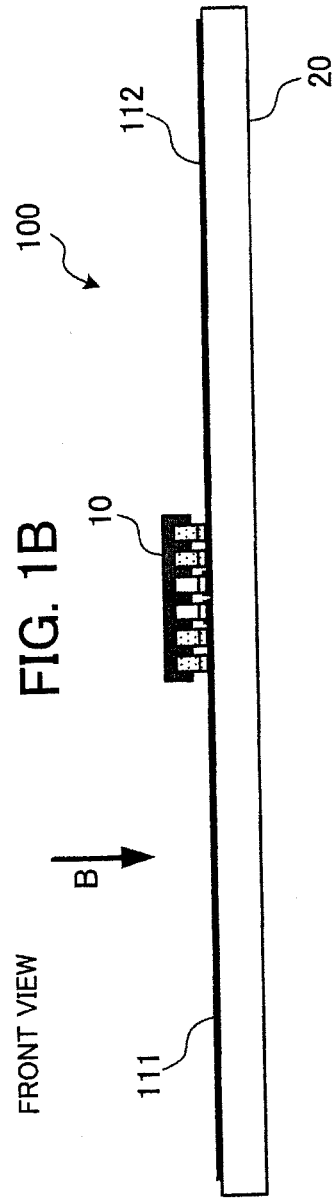

FIGS. 1A, 1B, and 1C illustrate a configuration of an RFID tag according to a first embodiment. FIG. 1A is a plan view, FIG. 1B is a front view, and FIG. 1C is a side view.

An RFID tag 100 illustrated in FIGS. 1A to 1C includes an IC package 10 and a substrate 20 of which this IC package 10 is mounted on an upper surface side. The IC package 10 is a packaged product with circuit components such as an IC chip encapsulated therein, for example, an SMD package. According to the present embodiment, in the inside of the IC package 10, a non-contact type IC chip is encapsulated. On the other hand, on the outside of the IC package 10, for example, twelve connection terminals T1 to T12 are provided. The connection terminals T1 to T6 are provided on one side of the IC package 10, and the connection terminals T7 to T12 are provided on an opposite side of the IC package 10 from the connection terminals T1 to T6.

The substrate 20 is made of an insulating material such as glass epoxy resin and polyimide resin. The substrate 20 may be, for example, a flexible substrate. Antenna patterns 111 and 112 are formed in a planar shape over the upper surface of the substrate 20. As described below, the antenna patterns 111 and 112 operate as a dipole antenna.

Figure 2:
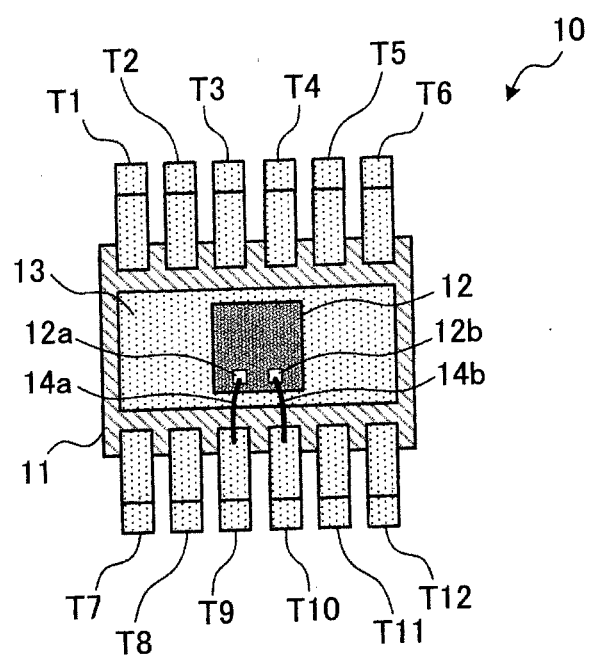
FIG. 2 is a cross sectional view of an independent dummy terminal IC package.

FIG. 2 is a cross sectional view of an independent dummy terminal IC package.

FIG. 2 illustrates a cross section of the IC package 10 viewed from the direction of the arrows A-A of the side view in FIG. 1C. A non-contact type IC chip 12 and a lead frame 13 are encapsulated in the inside of an outer packaging 11 of the IC package 10.

The IC chip 12 has a function of generating a drive power based on radio waves from an external device, communicating with this external device, and transmitting to the external device data stored in a memory circuit provided on the inside. The IC chip 12 may store data transmitted from, for example, the external device in the memory circuit, or alternatively, perform various processes using received data blocks or stored data blocks such as an authentication process with respect to the external device.

For example, the present embodiment assumes that the IC chip 12 operates using radio waves of ultra high frequency (UHF) band. In addition, frequencies of the UHF band available to RFID tags are different from country to country. For example, frequencies used in Japan range from 952 to 954 MHz, frequencies used in the United States of America range from 902 to 928 MHz, and frequencies used in Europe range from 869.4 to 869.65 MHz.

Further, input-output (I/O) signal terminals 12a and 12b for connecting to the antenna are provided on the IC chip 12. According to the present embodiment, the I/O signal terminal 12a and the connection terminal T9 are electrically connected by a bonding wire 14a, and the I/O signal terminal 12b and the connection terminal T10 are electrically connected by a bonding wire 14b. In other words, according to the present embodiment, only the connection terminals T9 and T10 serve as signal terminals for communication, and the other connection terminals T1 to T8, T11, and T12 serve as dummy terminals electrically insulated from the IC chip 12.

Further, the lead frame 13 in the IC package 10 is separated from the connection terminals T1 to T12, and the lead frame 13 and the connection terminals T1 to T12 are electrically insulated from each other. Accordingly, the connection terminals T1 to T8, T11, and T12 as the dummy terminals are electrically insulated from circuits in the IC package 10. Thus, the IC package having a configuration in which each dummy terminal is electrically insulated and independent from the internal circuits is here called an "independent dummy terminal" IC package. The dummy terminals are electrically insulated from the internal circuit and therefore, joined with the after-mentioned antenna pattern using solder, thereby improving reliability of junctions without causing short-circuit between the antenna patterns.

Figure 3:
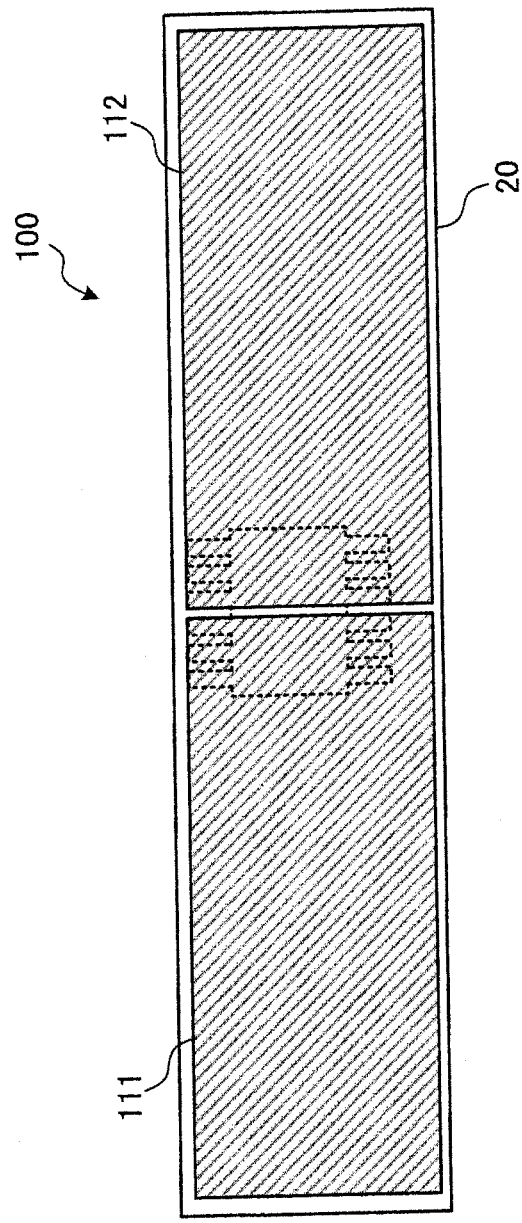
FIG. 3 illustrates a shape of an antenna pattern.

FIG. 3 illustrates a shape of the antenna pattern.

FIG. 3 illustrates a plan view of the RFID tag 100 before mounting the IC package 10. In FIG. 3, an external line of the IC package 10 is represented by the dotted line. As illustrated in FIG. 3, each antenna pattern 111 and 112 has a rectangle shape with the same lengths in the long-side and short-side directions of the substrate and is separated from each other in the central part of the substrate 20. Further, the antenna patterns 111 and 112 are formed so as to cover almost the entire upper surface of the substrate 20, thereby increasing an antenna effective area.

The antenna patterns 111 and 112 are formed over the substrate 20 by etching, printing, and adhesion using an electrically conductive body such as copper and aluminum. For example, a copper foil is stuck over the entire one surface of the substrate 20 and then etched, thus forming the antenna patterns 111 and 112. Further, a formation region of each antenna pattern 111 and 112 may be extended up to a peripheral portion of the upper surface of the substrate 20 except for a separation region separated from each other.

Returning to FIGS. 1A to 1C, the description will be continued below.

The IC package 10 is mounted on the substrate 20 such that the connection terminals T1 to T3 and T7 to T9 come in contact with the antenna pattern 111 and the connection terminals T4 to T6, and T10 to T12 come in contact with the antenna pattern 112. The connection terminal and the antenna pattern are fixed using an electrically conductive body such as solder.

The above-described configuration permits the IC chip 12 of the IC package 10 to be electrically connected to the antenna patterns 111 and 112 via the connection terminals T9 and T10 as the signal terminals, respectively. As a result, the IC chip 12 receives the supply of power from an external device, and transmits and receives a signal to and from the external device via the antenna patterns 111 and 112. The antenna patterns 111 and 112 operate as a dipole antenna. Specifically, the antenna pattern 111 functions as one element of the dipole antenna using as a feeding point the connection to the connection terminal T9, and the antenna pattern 112 functions as the other element of the dipole antenna using as a feeding point the connection to the connection terminal T10.

Figure 4:
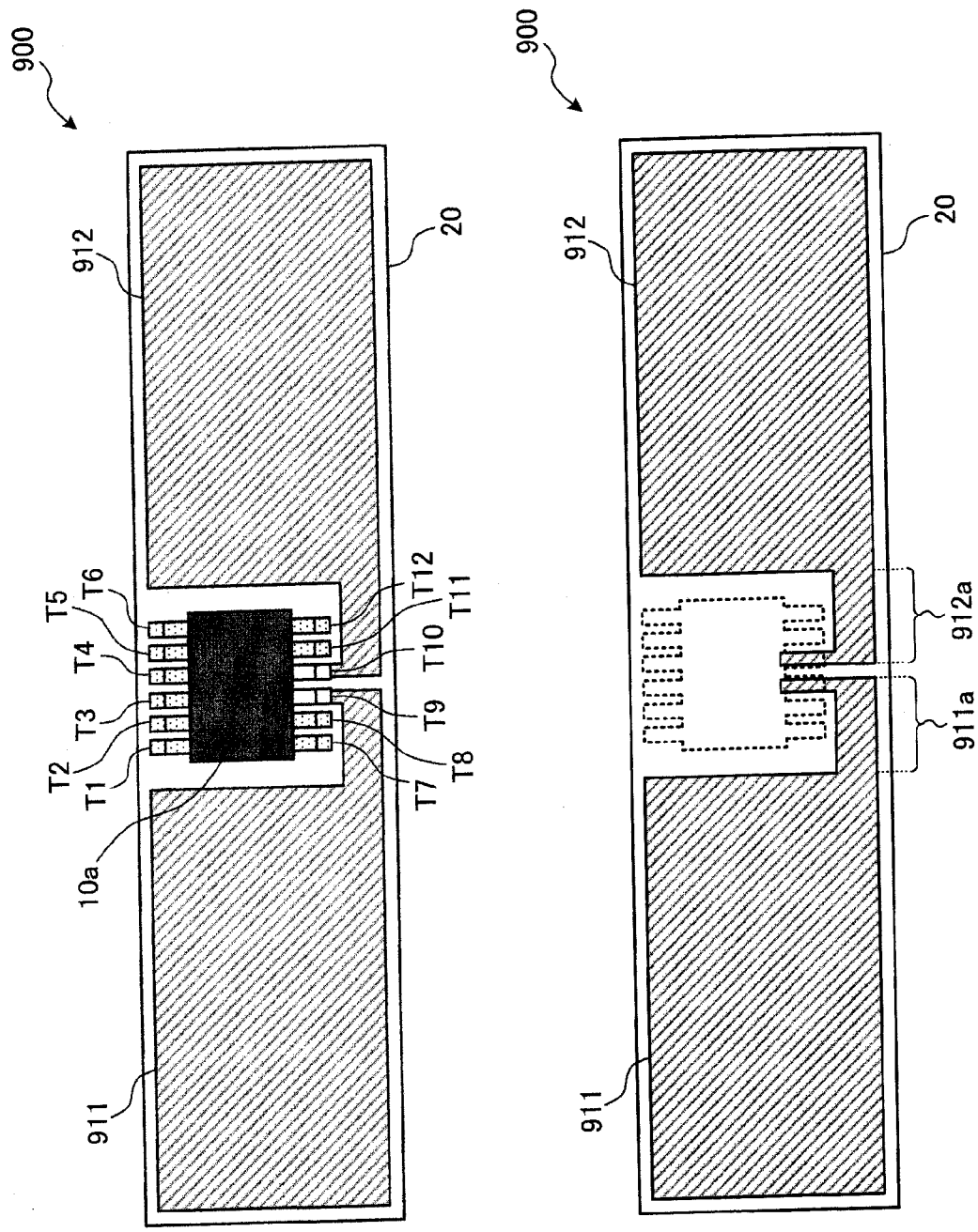
FIGS. 4A and 4B illustrate a reference example of the RFID tag.

Here, a reference example of the RFID tag having an antenna pattern with another shape is cited for comparison. FIGS. 4A and 4B illustrate a reference example of the RFID tag. FIG. 4A illustrates the RFID tag in the case where the IC package is mounted, and FIG. 4B illustrates the RFID tag in the case where the IC package is not mounted. When circuit components in FIGS. 4A and 4B are the same as those described in FIGS. 1A to 1C, the same reference numerals are given to them.

In an RFID tag 900 illustrated in FIGS. 4A and 4B, the tabular antenna patterns 911 and 912 separated from each other in the central part are formed over the upper surface of the substrate 20 in the same manner as in the example of FIGS. 1A to 1C. Note, however, that in the RFID tag 900 in FIGS. 4A and 4B, the antenna patterns 911 and 912 are formed so as not to overlap with the region on which an IC package 10a is mounted. In other words, in the formation regions of the antenna patterns 911 and 912, connection regions 911a and 912a of the central part side of the substrate 20 are formed more narrowly than the other regions so as not to overlap with the mounting region of the IC package 10a. Ends of the connection regions 911a and 912a are connected to the connection terminals T9 and T10 as the signal terminals.

In this RFID 900, the connection terminals T1 to T8, T11, and T12 as the dummy terminals are prevented from coming in contact with the antenna patterns 911 and 912. The above-described configuration permits the IC package 10a having a configuration in which all the dummy terminals are electrically connected to each other inside to be mounted on the substrate 20. Here, the IC package having a configuration in which all the dummy terminals are electrically connected to each other inside is called a "connection dummy terminal" IC package.

Figure 5:
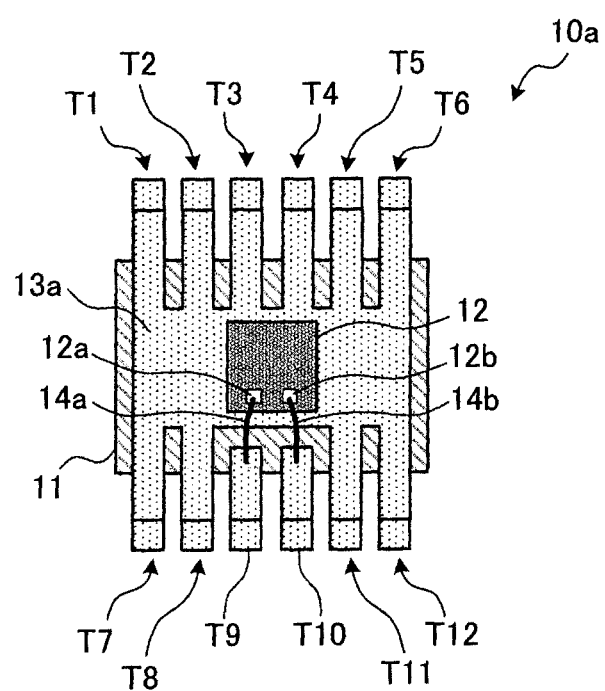
FIG. 5 is a cross sectional view illustrating a configuration example of the IC package of a connection dummy terminal.

FIG. 5 is a cross sectional view illustrating an example configuration of the connection dummy terminal IC package. When circuit components in FIG. 5 are the same as those described in FIG. 2, the same reference numerals are given to them.

In the IC package 10a illustrated in FIG. 5, in the same manner as in the IC package 10 of FIG. 2, the connection terminals T9 and T10 as the signal terminals are electrically insulated from a lead frame 13a. Further, the connection terminals T9 and T10 are electrically connected to the input and output signal terminals 12a and 12b of the IC chip 12 via the bonding wires 14a and 14b, respectively.

However, in the IC package 10a, the connection terminals T1 to T8, T11, and T12 as the dummy terminals are formed integrally with the lead frame 13a. Therefore, when the dummy terminals come into contact with the antenna patterns 911 and 912, the antenna patterns 911 and 912 are short-circuited, and as a result, fail to function as a dipole antenna. The RFID tag 900 illustrated in FIGS. 4A and 4B can avoid the above-described situation.

The present embodiment illustrated in FIGS. 1A to 1C provides the RFID tag 100 having mounted thereon the independent dummy terminal IC package 10 in which the dummy terminals and the internal circuit are electrically insulated from each other, as compared with the RFID tag 900 illustrated in FIGS. 4A and 4B. This configuration permits the formation region of the antenna patterns 111 and 112 to be extended to under the IC package 10. In particular, this configuration permits the formation region of the antenna patterns 111 and 112 to be extended to under the installation region of the outer packaging 11 and dummy terminals of the IC package 10. Accordingly, the antenna effective area of the antenna patterns 111 and 112 is extended, and the IC chip 12 makes it possible to have a longer distance capable of communication without increasing a size of the entire RFID tag 100.

While the above description of the first embodiment has assumed that the connection terminals T9 and T10 serve as the signal terminal, the applicable IC package is not limited to the that configuration. Specifically, the first embodiment can be applied to the IC package in which two adjacent connection terminals serve as the signal terminals. For example, the first embodiment can be applied to the IC package in which the connection terminals T5 and T6 serve as the signal terminals among the connection terminals T1 to T12. In this case, the IC package is mounted on the substrate 20, for example, such that the connection terminals T5 and T6 come in contact with the antenna patterns 111 and 112, respectively.

Second Embodiment

FIGS. 6A and 6B illustrate a configuration of the RFID tag according to a second embodiment. FIG. 6A illustrates the RFID tag on which the IC package is mounted, and FIG. 6B illustrates the RFID tag on which the IC package is not mounted, respectively. When circuit components in FIG. 6 are the same as those described in FIGS. 1A to 1C, the same reference numerals are given to them.

The RFID tag 150 illustrated in FIG. 6 includes the same substrate 20 as that in the first embodiment, the IC package 10b is mounted on the upper surface of the substrate 20. In the same manner as in the IC package 10 according to the first embodiment, the IC package 10b is the independent dummy terminal IC package in which the dummy terminals are electrically insulated from the internal circuit. Note that the IC package 10b differs from the IC package 10 according to the first embodiment in the following. That is, in the IC package 10*b*, two signal terminals for allowing the internal non-contact type IC chip to perform communication are provided on opposite sides of the IC package 10*b*. Referring to FIGS. 6A and 6B, for example, the connection terminals T3 and T9 serve as the signal terminals and the other connection terminals T1, T2, T4 to T8, and T10 to T12 serve as the dummy terminals.

Over the upper surface of the substrate 20, antenna patterns 161 and 162 are formed in a planar shape. Materials and its forming method of the antenna patterns 161 and 162 are the same as those of the antenna patterns 111 and 112 according to the first embodiment. Both of the antenna patterns 161 and 162 have rectangle shapes with the same lengths in the long-side and short-side directions with each other. Further, at the opposite ends of the rectangle regions of the antenna patterns 161 and 162, the convex portions 161*a* and 162*a* are alternately formed, respectively.

The antenna patterns 161 and 162 are formed so as to cover almost the entire upper surface of the substrate 20, thereby increasing the antenna effective area. Further, the formation region of each antenna pattern 161 and 162 may be extended up to a peripheral portion of the upper surface of the substrate 20 except for the separation region between the formation regions.

The IC package 10*b* is mounted on the substrate 20 such that the connection terminals T1, T2, and T7 to T9 come in contact with the antenna pattern 161, and the connection terminals T3 to T6 and T10 to T12 come in contact with the antenna pattern 162, respectively. In particular, the connection terminals T9 and T3 as the signal terminals come in contact with the convex portions 161*a* and 162*a* of the antenna patterns 161 and 162, respectively. This processing permits the IC chip of the IC package 10*b* to be connected to the antenna patterns 161 and 162 via the connection terminals T9 and T3. As a result, the IC chip receives the supply of power from the external device, and transmits and receives a signal to and from the external device via the antenna patterns 161 and 162.

Further, the antenna patterns 161 and 162 operate as a dipole antenna. Specifically, the antenna pattern 161 functions as one element of the dipole antenna using as a feeding point the connection to the connection terminal T9, and the antenna pattern 162 functions as the other element of the dipole antenna using as a feeding point the connection to the connection terminal T3.

The above-described second embodiment assumes that each antenna pattern 161 and 162 has a shape of each convex portion 161*a* and 162*a*, and the signal terminals of the IC package 10*b* are electrically connected to the convex portions 161*a* and 162*a*. The above-described configuration permits the antenna effective area to be extended to under the IC package 10*b*. Therefore, the IC chip makes it possible to have a longer distance capable of communication without increasing a size of the entire RFID tag 150.

While the above description of the second embodiment has assumed that the connection terminals T3 and T9 serve as the signal terminals, the applicable IC package is not limited to that configuration. Specifically, the second embodiment can be applied to the IC package in which the connection terminals arranged at the opposite sides of the IC package serve as the signal terminals. For example, the second embodiment can be applied to the IC package in which the connection terminals T1 and T7 serve as the signal terminals among the connection terminals T1 to T12. In this case, the IC package is mounted on the substrate 20, for example, such that the connection terminals T7 and T1 come into contact with the convex portions 161*a* and 162*a* of the antenna patterns 161 and 162, respectively.

Third Embodiment

FIGS. 7A and 7B illustrate a configuration of the RFID tag according to a third embodiment. FIG. 7A illustrates the RFID tag on which the IC package is mounted, and FIG. 7B illustrates the RFID tag on which the IC package is not mounted. When circuit components in FIGS. 7A and 7B are the same as those described in FIGS. 1A to 1C, the same reference numerals are given to them.

The RFID tag 200 illustrated in FIGS. 7A and 7B includes the same substrate 20 as that of the first embodiment, and the IC package 10 is mounted on the upper surface of the substrate 20. The IC package 10 is the independent dummy terminal IC package having the same configuration as in the first embodiment, in which the connection terminals T9 and T10 serve as the signal terminals. Note that the present embodiment assumes that the IC package 10 is mounted on the substrate 20 in a state where the IC package 10 is turned in the right direction by 90 degrees as compared with the first embodiment as viewed from the upper direction of the substrate 20.

Over the upper surface of the substrate 20, antenna patterns 211 and 212 are formed in a planar shape. Materials and its forming method of the antenna patterns 211 and 212 are the same as those of the antenna patterns 111 and 112 according to the first embodiment. The antenna pattern 211 has a shape in which a concave portion 211*a* is formed at one end of one rectangle. The antenna pattern 212 has a shape in which a convex portion 212*a* is formed at another end of another rectangle. The one end of the side on which the concave portion 211*a* of the antenna pattern 211 is formed and the other end of the side on which the convex portion 212*a* of the antenna pattern 212 is formed are opposite to each other putting the separation region therebetween. Further, the convex portion 212*a* is formed such that its tip is located in the inside of the concave portion 211*a*.

The antenna patterns 211 and 212 are formed so as to cover almost the entire upper surface of the substrate 20, thereby increasing the antenna effective area. Further, the formation region of each antenna pattern 211 and 212 may be extended up to a peripheral portion of the upper surface of the substrate 20 except for the separation region between the formation regions.

The IC package 10 is mounted on the substrate such that the opposite connection terminals are arranged over the separation region between the antenna patterns 211 and 212. Specifically, among the connection terminals of the IC package 10, the connection terminals T1 to T6 as the dummy terminals come into contact with the antenna pattern 212. On the other hand, the connection terminals T7, T8, T11, and T12 as the dummy terminals come into contact with the antenna pattern 211.

Further, the connection terminal T9 as one signal terminal also comes into contact with the antenna pattern 211. On the other hand, the connection terminal T10 as the other signal terminal comes into contact with the convex portion 212*a* of the antenna pattern 212. Here, the antenna patterns 211 and 212 are preferably formed such that the positions in which the connection terminals T9 and T10 come into contact with the antenna patterns 211 and 212, respectively, are located in the center of the entire length of the antenna patterns 211 and 212 in the long-side direction of the substrate 20.

The above-described configuration permits the IC chip of the IC package 10 to be connected to the antenna patterns 211 and 212 via the connection terminals T9 and T10, respectively. As a result, the IC chip receives the supply of power from the external device, and transmits and receives a signal to and from the external device via the antenna patterns 211 and 212. The antenna patterns 211 and 212 operate as a dipole antenna. Specifically, the antenna pattern 211 functions as one element of the dipole antenna using as a feeding point the connection to the connection terminal T9, and the antenna pattern 212 functions as the other element of the dipole antenna using as a feeding point the connection to the connection terminal T10.

According to the third embodiment, the above-described RFID tag 200 has a shape in which the antenna pattern 211 has the concave portion 211a and in which the antenna pattern 212 has the convex portion 212a. Further, the one signal terminal of the IC package 10 is electrically connected to the convex portion 212a, and the other signal terminal is electrically connected to the region of the antenna pattern 211 adjacent to the convex portion 212a. The above-described configuration permits the antenna effective area to be extended to under the IC package 10. Therefore, the IC chip makes it possible to have a longer distance capable of communication without increasing a size of the entire RFID tag 200.

While the above description of the third embodiment has assumed that the connection terminals T9 and T10 serve as the signal terminals, the applicable IC package is not limited to that configuration. Specifically, the third embodiment can be applied to the IC package in which two connection terminals of those provided on the same end side of the IC package serve as the signal terminals.

Fourth Embodiment

The above-described first to third embodiments provide the RFID tag in the case of using the independent dummy terminal IC package having a configuration in which the dummy terminals are electrically insulated from the internal circuit. As compared with the first to third embodiments, the following fourth embodiment will describe the RFID tag in which not only the independent dummy terminal IC package but also the connection dummy terminal IC package having a configuration in which all the dummy terminals are electrically connected to each other inside can be mounted.

Figure 8A:
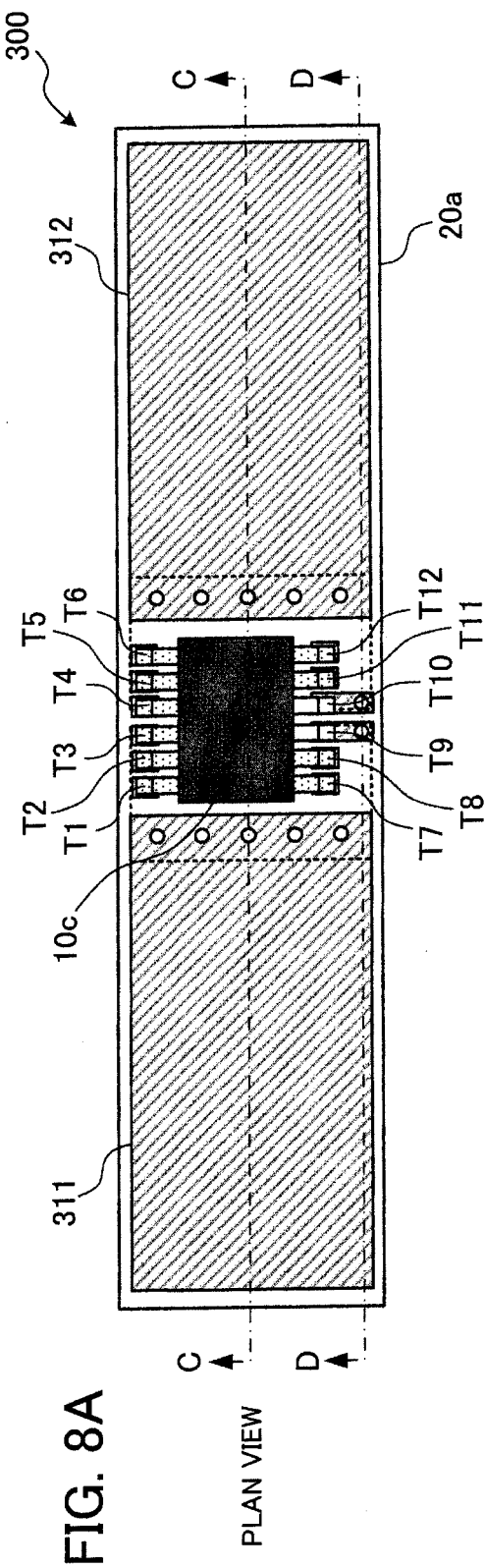
FIGS. 8A and 8B illustrate a configuration of the RFID tag according to a fourth embodiment.
Figure 8B:
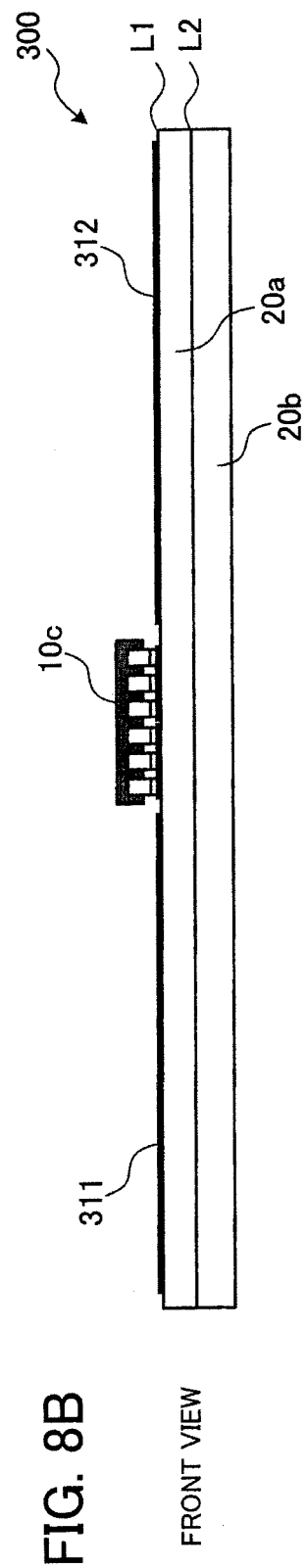

FIGS. 8A and 8B illustrate a configuration of the RFID tag according to the fourth embodiment. FIG. 8A is a plan view, and FIG. 8B is a front view. When circuit components in FIGS. 8A and 8B are the same as those described in FIGS. 1A to 1C, the same reference numerals are given to them.

As illustrated in FIGS. 8A and 8B, an RFID tag 300 includes two-layer laminated substrates 20a and 20b, and an IC package 10c is mounted on the upper surface of the upper substrate 20a. Both of the substrates 20a and 20b are made of the same insulating materials as those of the substrate 20 according to the first to third embodiments. According to the present embodiment, for example, tabular wiring patterns such as an antenna pattern and an electrically conductive pad, or mounting pad are formed over a wiring layer L1 of the upper surface of the substrate 20a and a wiring layer L2 between the substrates 20a and 20b. The present embodiment assumes that the wiring layer L2 is formed over the upper surface of the substrate 20b. The wiring patterns of the wiring layers L1 and L2 are made of an electrically conductive body such as copper and aluminum.

The wiring patterns of the wiring layers L1 and L2 are formed over the substrates 20a and 20b, respectively, by etching, printing, and adhesion using an electrically conductive body such as copper and aluminum. For example, a copper foil is stuck over the entire one surface of each substrate 20a and 20b and then etched, thereby forming each wiring pattern of the wiring layers L1 and L2.

The IC package 10c includes twelve connection terminals T1 to T12. According to the present embodiment, the connection terminals T9 and T10 serve as the signal terminals, and the other connection terminals T1 to T8, T11, and T12 serve as the dummy terminals. Any type of the independent dummy terminal IC package and the connection dummy terminal IC package may be used as the IC package 10c. For example, the internal configuration of the IC package 10c may be the same as that of the independent dummy terminal IC package 10 illustrated in FIG. 2, or the connection dummy terminal IC package 10a illustrated in FIG. 5.

FIGS. 9A and 9B illustrate shapes of wiring patterns. FIG. 9A illustrates a wiring pattern of a first wiring layer (L1), and FIG. 9B illustrates a wiring pattern of a second wiring layer (L2). Further, FIGS. 10A and 10B are cross sectional views of the RFID tag according to the fourth embodiment. FIG. 10A is a cross sectional view of the RFID tag viewed from the direction of the arrows C-C in FIG. 8A, and FIG. 10B is a cross sectional view of the RFID tag viewed from the direction of the arrows D-D in FIG. 8A.

The wiring pattern formed over the wiring layer L1 will be first described. Antenna patterns 311 and 312, mounting pads 321 and 322 contacting the signal terminal, and mounting pads 331 to 340 contacting the dummy terminal are formed as a wiring pattern over the wiring layer L1 of the upper surface of the substrate 20a. Both of the antenna patterns 311 and 312 have a shape of a rectangle or square that has the same length at least in the short-side direction of the substrate 20a. The antenna patterns 311 and 312 are formed on both sides of an intermediate region 21 located in the center of the upper surface of the substrate 20a. Further, the antenna patterns 311 and 312 are formed so as to cover almost the entire surface of regions except the intermediate region 21 among the upper surface of the substrate 20a, thereby increasing the antenna effective area. Further, the formation regions of the antenna patterns 311 and 312 may be extended up to a peripheral portion of the upper surface of the substrate 20a except for the intermediate region 21.

Further, via holes 351 for electrically connecting to the wiring layer L2 are formed in one end region of the intermediate region 21 side in the formation region of the antenna pattern 311. Similarly, via holes 352 for electrically connecting to the wiring layer L2 are formed in the other end region of the intermediate region 21 side in the formation region of the antenna pattern 312.

The IC package 10c is mounted on the intermediate region 21. Further, the mounting pads 321, 322, and 331 to 340 are formed on the intermediate region 21. When the IC package 10c is mounted on the intermediate region 21, the mounting pads 321 and 322 are electrically contacted with the connection terminals T9 and T10 as the signal terminals, respectively. When IC package 10c is mounted on the intermediate region 21, the mounting pads 331 to 340 are electrically contacted with the connection terminals T1 to T8, T11, and T12 as the dummy terminals, respectively. The mounting pads 331 to 340 serve, for example, as the ground wiring lines for the IC chip. In addition, the mounting pads 331 to 336 may be integrally formed. On the other hand, each pair of the mounting pads 337 and 338 and the mounting pads 339 and 340 may also be integrally formed.

The via holes 353 and 354 for electrically connecting to the wiring layer L2 are formed through the mounting pads 321 and 322 among these mounting pads, respectively. While the above description of the example RFID tag illustrated in FIGS. 9A and 9B has assumed that the mounting pads 321 and 322 are extended to the outward direction of the IC package 10c from a connection to the connection terminals T9 and T10, respectively, the mounting pads 321 and 322 are not limited to these shapes. For example, the mounting pads 321 and 322 may be extended to under the IC package 10c from connection to the connection terminals T9 and T10, respectively. In this case, the via holes 353 and 354 may be formed under the IC package 10c.

Next, the wiring pattern formed over the wiring layer L2 will be described. Over the wiring layer L2 of the upper surface of the substrate 20b, the antenna patterns 361 and 362 are formed as the wiring patterns. Both of the antenna patterns 361 and 362 have a shape of a rectangle or square, and the same length at least in the short-side direction of the substrate 20b. The antenna patterns 361 and 362 are formed near the center of the substrate 20b, and separated from each other in the center of the substrate 20b. The formation region of each antenna pattern 361 and 362 may be extended in the short-side direction of the upper surface of the substrate 20b, that is, up to the end of the vertical direction of the upper surface of the substrate 20b in FIGS. 9A and 9B.

As illustrated in FIGS. 9 and 10, in the formation region of the antenna pattern 361, the end region of an opposite side from the antenna pattern 362 includes a region in which the via holes 351 are formed. Further, the antenna pattern 361 is electrically connected to the antenna pattern 311 of the wiring layer L1 through the via holes 351. In the formation region of the antenna pattern 361, the end region on an opposite side to the antenna pattern 362 includes a region in which the via hole 353 is formed. The antenna pattern 361 is electrically connected to the mounting pad 321 of the wiring layer L1 through the via hole 353.

On the other hand, in the formation region of the antenna pattern 362, the end region of an opposite side from the antenna pattern 361 includes a region in which the via holes 352 are formed. The antenna pattern 362 is electrically connected to the antenna pattern 312 of the wiring layer L1 through the via holes 352. Further, in the formation region of the antenna pattern 362, the end region on an opposite side to the antenna pattern 361 includes a region in which the via hole 354 is formed. The antenna pattern 362 is electrically connected to the mounting pad 322 of the wiring layer L1 through the via hole 354.

Here, when viewed from the direction of the upper surface of the substrate 20a, both of one region including the antenna patterns 311 and 361 and another region including the antenna patterns 312 and 362 preferably have the same length in the long-side direction of each substrate 20a and 20b.

The above-described configuration permits the IC chip of the IC package 10c to be electrically connected to the antenna patterns 361 and 311 via the connection terminal T9 as the signal terminal. Similarly, the configuration permits the IC chip to be electrically connected to the antenna patterns 362 and 312 via the connection terminal T10 as the signal terminal. As a result, the IC chip receives the supply of power from the external device, and transmits and receives a signal to and from the external device via the antenna patterns 311, 312, 361, and 362. The antenna patterns 311, 312, 361, and 362 operate as a dipole antenna. Specifically, the antenna patterns 311 and 361 function as one element of the dipole antenna using as a feeding point the via hole 353, and the antenna patterns 312 and 362 function as the other element of the dipole antenna using as a feeding point the via hole 354.

The fourth embodiment assumes that the antenna pattern is separated into the wiring layers L1 and L2 and formed. Further, over the wiring layer L1, the antenna patterns 311 and 312 are formed over the regions except the region on which the IC package 10c is mounted, and the dummy terminals of the IC package 10c are prevented from coming into contact with the antenna patterns 311 and 312. This processing permits any type of the independent dummy terminal IC package and the connection dummy terminal IC package to be used as the IC package 10c, and versatility to be improved.

Over the wiring layer L2, the antenna patterns 361 and 362 are formed over the region under the IC package 10c. Further, the antenna patterns 361 and 362 are electrically connected to the antenna patterns 311 and 312 of the wiring layer L1 through the via holes 351 and 352, respectively, and are electrically connected to the signal terminals of the IC package 10c through the via holes 353 and 354, respectively. This processing permits the antenna effective area to be extended to under the IC package 10c. In particular, this processing permits the antenna effective area to be extended to under the outer packaging and dummy terminals of the IC package 10c. Accordingly, the IC chip makes it possible to have a longer distance capable of communication without increasing a size of the entire RFID tag 300.

In the RFID tag 300, the mounting pads 331 to 340 contacting the dummy terminals of the IC package 10c may not be necessarily formed. Note, however, that when the connection dummy terminal IC package is particularly used as the IC package 10c, the mounting pads 331 to 340 are preferably formed. In the connection dummy terminal IC package, a potential of the dummy terminal is requested to be set to the ground potential in many cases. In the above-described case, when the mounting pads 331 to 340 contacting the dummy terminals are formed, a potential of the dummy terminal can be set to the ground level via these mounting pads 331 to 340. The mounting pads 331 to 340 are preferably contacted with, for example, a ground terminal outside the RFID tag 300 or ground wiring lines formed on the substrate of the RFID tag 300.

While the above description of the fourth embodiment has assumed that the wiring layer L2 is formed over the upper surface of the substrate 20b, the fourth embodiment is not limited to that configuration. For example, the wiring layer L2 may be formed over the bottom surface of the substrate 20a. In this case, the antenna patterns 361 and 362 are formed over the bottom surface of the substrate 20a. Accordingly, in this case, the RFID tag avoids the need to include the substrate 20b.

While the above description of the fourth embodiment has assumed that the connection terminals T9 and T10 serve as the signal terminals, the applicable IC package is not limited to that configuration. For example, the IC package in which two connection terminals of those provided on the same end side serve as the signal terminals can be applied to the fundamental configuration of the substrate and wiring pattern similar to the ones that have been illustrated and discussed in the above example. In this case, the position of the mounting pad contacting the signal terminal or the dummy terminal is arbitrarily set depending on the position of the connection terminal as the signal terminal or as the dummy terminal. Further, the fifth embodiment can be applied to the IC package in which connection terminals arranged in opposite ends serves as the signal terminals, as described in the following fifth embodiment.

Fifth Embodiment

Figure 11:
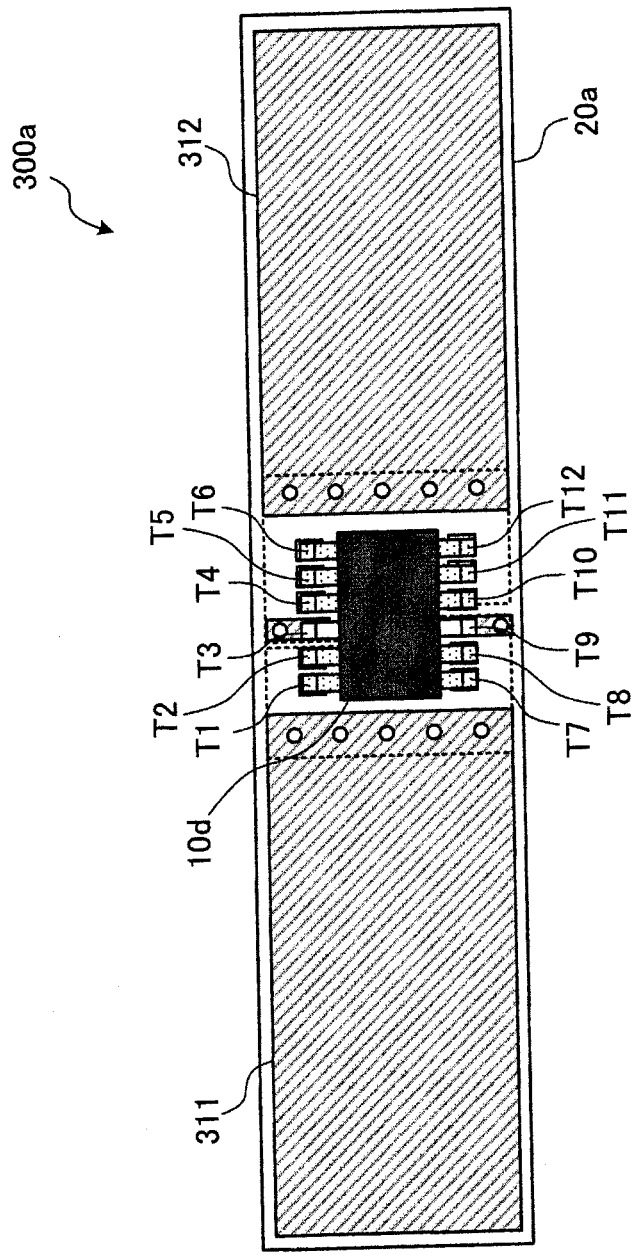
FIG. 11 is a plan view illustrating a configuration of the RFID tag according to a fifth embodiment.

FIG. 11 is a plan view illustrating a configuration of the RFID tag according to a fifth embodiment. Further, FIGS. 12A and 12B illustrate shapes of the wiring patterns. FIG. 12A illustrates a wiring pattern of the first wiring layer (L1), and FIG. 12B illustrates a wiring pattern of the second wiring layer (L2). When circuit components in FIGS. 11 and 12 are the same as those described in FIGS. 8 and 9, the same reference numerals are given to them.

The present embodiment provides an RFID tag 300a in which an IC package 10d mounted on the substrate 20a includes twelve connection terminals T1 to T12. The present embodiment assumes that the connection terminals T3 and T9 serve as the signal terminals, and the other connection terminals T1, T2, T4 to T8, and T10 to T12 serve as the dummy terminals. Any type of the independent dummy terminal IC package and the connection dummy terminal IC package may be used as the IC package 10d, in the same manner as in the fourth embodiment.

Also, the RFID tag 300a includes the laminated-together substrates 20a and 20b, and the IC package 10d is mounted on the upper surface of the substrate 20a, in the same manner as in the fourth embodiment. Further, over the wiring layer L1 of the upper surface of the substrate 20a, the antenna patterns 311 and 312 of the rectangle or square are formed putting the intermediate region 21 therebetween. Both of the antenna patterns 311 and 312 have the same length at least in the short-side direction of the substrate 20a. The via holes 351 and 352 for electrically connecting to the wiring layer L2 of the upper surface of the substrate 20b are formed in the end regions of each intermediate region 21 side of the antenna patterns 311 and 312, respectively.

On the intermediate region 21, mounting pads 371 and 372 contacting the signal terminals and mounting pads 381 to 390 contacting the dummy terminals are formed. When the IC package 10d is mounted on the substrate 20a, the mounting pads 371 and 372 are electrically contacted with the connection terminals T3 and T9 as the signal terminals, respectively. Further, the mounting pads 381 to 390 are electrically contacted with the connection terminals T1, T2, T4 to T8, and T10 to T12 as the dummy terminals, respectively, and serve, for example, as the ground wiring lines of the IC chip. Further, the via holes 371a and 372a for electrically connecting to the wiring layer L2 are formed through the mounting pads 371 and 372, respectively. In addition, the mounting pads 381 to 390 contacting the dummy terminals of the IC package 10d are not essential constituents, in the same manner as in the fourth embodiment.

Over the wiring layer L2, the antenna patterns 391 and 392 are formed. The antenna patterns 391 and 392 are formed near the center of the substrate 20b and separated from each other in the center of the substrate 20b in the same manner as in the antenna patterns 361 and 362 according to the fourth embodiment. Both of the antenna patterns 391 and 392 have the same length at least in the short-side direction of the substrate 20b.

In the formation region of the antenna pattern 391, the end region of an opposite side from the antenna pattern 392 includes a region in which the via holes 351 are formed. Further, the antenna pattern 391 is electrically connected to the antenna pattern 311 of the wiring layer L1 through the via holes 351. On the other hand, in the formation region of the antenna pattern 392, the end region of an opposite side from the antenna pattern 391 includes a region in which the via holes 352 are formed. Further, the antenna pattern 392 is electrically connected to the antenna pattern 312 of the wiring layer L1 through the via holes 352.

Both of the antenna patterns 391 and 392 have shapes of rectangle or square with the same length at least in the short-side direction of the substrate 20b. The convex portions 391a and 392a are alternately formed at the opposite ends in their regions of the rectangle or square. The convex portion 391a includes a region in which the via hole 371a is formed. The antenna pattern 391 is electrically connected to the mounting pad 371 on the wiring layer L1 through the via hole 371a. On the other hand, the convex portion 392a includes a region in which the via hole 372a is formed. The antenna pattern 392 is electrically connected to the mounting pad 372 of the wiring layer L1 through the via hole 372a.

Here, the positions in which the via holes 371a and 372a are formed are preferably located in the center of the entire length of the antenna patterns 311, 312, 391, and 392 in the long-side direction of the substrates 20a and 20b.

The above-described configuration permits the IC chip of the IC package 10d to be electrically connected to the antenna patterns 391 and 311 via the connection terminal T9 as the signal terminal. Similarly, the configuration permits the IC chip of the IC package 10d to be electrically connected to the antenna patterns 392 and 312 via the connection terminal T3 as the signal terminal. As a result, the IC chip receives the supply of power from the external device, and transmits and receives a signal to and from the external device via the antenna patterns 311, 312, 391, and 392. The antenna patterns 311, 312, 391, and 392 operate as a dipole antenna. Specifically, the antenna patterns 311 and 391 function as one element of the dipole antenna using as a feeding point the via hole 371a, and the antenna patterns 312 and 392 function as the other element of the dipole antenna using as a feeding point the via hole 372a.

According to the fifth embodiment, the RFID tag 300a permits any type of the independent dummy terminal IC package and the connection dummy terminal IC package to be used as the IC package 10d, and versatility to be improved, in the same manner as in the fourth embodiment. When the antenna effective area is extended to under the IC package 10d, the IC chip makes it possible to have a longer distance capable of communication without increasing a size of the entire RFID tag 300a.

While the above description of the fifth embodiment has assumed that the wiring layer L2 is formed over the upper surface of the substrate 20b, the fifth embodiment is not limited to that configuration. For example, the wiring layer L2 may be formed over the bottom surface of the substrate 20a. In this case, the antenna patterns 391 and 392 are formed over the bottom surface of the substrate 20a. In this case, the RFID tag avoids the need to include the substrate 20b.

Sixth Embodiment

Figure 15:
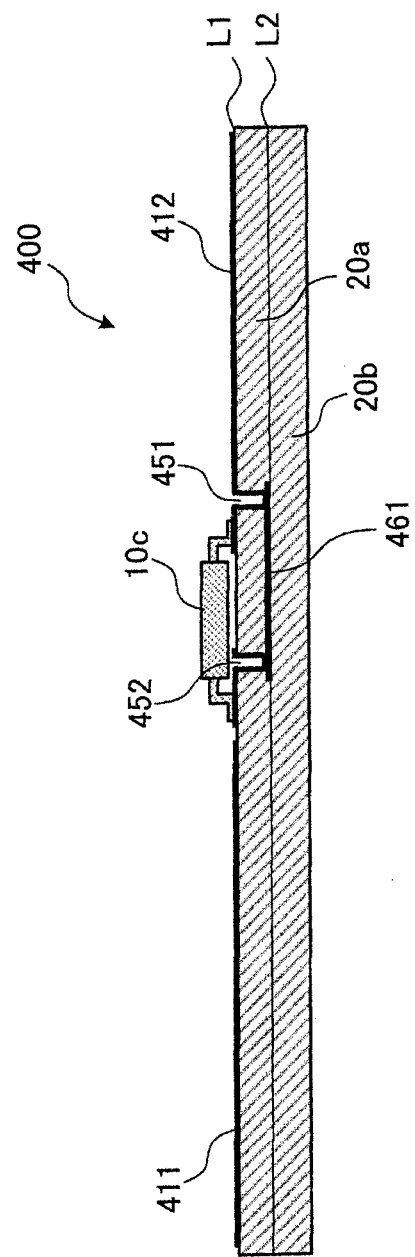
FIG. 15 is a cross sectional view of the RFID tag according to the sixth embodiment.

FIGS. 13A and 13B illustrate a configuration of the RFID tag according to a sixth embodiment. FIG. 13A is a plan view, and FIG. 13B is a front view. Further, FIGS. 14A and 14B illustrate shapes of the wiring patterns. FIG. 14A illustrates a wiring pattern of the first wiring layer (L1), and FIG. 14B illustrates a wiring pattern of the second wiring layer (L2). Further, FIG. 15 is a cross sectional view of the RFID tag according to the sixth embodiment. FIG. 15 illustrates a cross sectional view of the RFID tag viewed from the direction of the arrows E-E in FIG. 13A. When circuit components in FIGS. 13 to 15 are the same as those described in FIGS. 8 to 10, the same reference numerals are given to them.

The present embodiment provides the RFID tag 400 that includes the two-layer laminated substrates 20a and 20b and in which the IC package 10c is mounted on the upper surface of the upper substrate 20a, in the same manner as in the fourth embodiment. Note, however, that according to the present embodiment, the IC package 10c is mounted on the substrate 20a in a state of being turned in the right direction by 90 degrees as compared with the fourth embodiment when viewed from the upper direction of the substrate 20a.

The IC package 10c has a configuration similar to the one to which the fourth embodiment is applied. Specifically, the IC package 10c includes twelve connection terminals T1 to T12, and the connection terminals T9 and T10 serve as the signal terminals. On the other hand, the other connection terminals T1 to T8, T11, and T12 serve as the dummy terminals. Any type of the independent dummy terminal IC package and the connection dummy terminal IC package may be used as the IC package 10c.

On the wiring layer L1 of the upper surface of the substrate 20a, the antenna patterns 411 and 412, the mounting pad 421 contacting the signal terminal, and the mounting pads 431 to 440 contacting the dummy terminals are formed as a wiring pattern. The antenna patterns 411 and 412 are formed on both sides of the intermediate region 22 of the substrate 20a. The antenna pattern 411 has a rectangle shape in which the convex portion 411a is formed at the end of the intermediate region 22 side. On the other hand, the antenna pattern 412 has a rectangle or square shape. Both of the antenna patterns 411 and 412 have the same length in the short-side direction of the substrate 20a.

Further, the antenna patterns 411 and 412 are formed so as to cover almost the entire surface of the region except the intermediate region 22 of the upper surface of the substrate 20a, thereby increasing the antenna effective area. Further, a formation region of each antenna pattern 411 and 412 may be extended up to a peripheral portion of the upper surface of the substrate 20a except for the intermediate region 22.

In the antenna pattern 411, the convex portion 411a is formed such that a part of its region includes a region between the mounting pads 438 and 439 and is prevented from coming in contact with the adjacent mounting pads 438 and 421. When the IC package 10c is mounted on the substrate 20a, the convex portion 411a is electrically connected to the connection terminal T9 as the signal terminal. On the other hand, the via holes 451 for electrically connecting to the wiring layer L2 are formed in the end region of the intermediate region 22 side in the formation region of the antenna pattern 412.

The IC package 10c is mounted on the intermediate region 22. Further, the mounting pads 421, and 431 to 440 are formed on the intermediate region 22. When the IC package 10c is mounted on the intermediate region 22, the mounting pad 421 is electrically contacted with the connection terminal T10 as the signal terminal. Through a part of the formation region of the mounting pad 421, the via hole 452 for electrically connecting to the wiring layer L2 is formed. On the other hand, when the IC package 10c is mounted on the intermediate region 22, the mounting pads 431 to 440 are electrically contacted with the connection terminals T1 to T8, T11, and T12 as the dummy terminals, respectively, and serve, for example, as ground wiring lines of the IC chip.

In addition, the mounting pads 431 to 436 may be integrally formed. Each pair of the mounting pads 437 and 438 and the mounting pads 439 and 440 may be integrally formed. In the same manner as in the fourth embodiment, the mounting pads 431 to 440 contacting the dummy terminals of the IC package 10c are not essential constituents.

Over the wiring layer L2 of the upper surface of the substrate 20b, the antenna pattern 461 is formed as the wiring pattern. The antenna pattern 461 is formed under the intermediate region 22 of the substrate 20a, and its formation region includes a region in which the via holes 451 and 452 are formed. Further, the antenna pattern 461 is electrically connected to the antenna pattern 412 of the wiring layer L1 through the via holes 451, and electrically connected to the mounting pad 421 of the wiring layer L1 through the via hole 452. In addition, on the upper surface of the substrate 20b, the formation region of the antenna pattern 461 may be extended in the short-side direction of the substrate 20b, that is, up to the end of the vertical direction in FIGS. 14A and 14B on the upper surface of the substrate 20b.

Here, the convex portion 411a and the mounting pad 421 are preferably formed such that the connections to the connection terminals T9 and T10 are located, respectively, in the center of the entire length of the antenna patterns 411, 412, and 461 in the long-side direction of the substrates 20a and 20b.

The above-described configuration permits the IC chip of the IC package 10c to be electrically connected to the antenna pattern 411 via the connection terminal T9 as the signal terminal. Similarly, the configuration permits the IC chip to be electrically connected to the antenna patterns 461 and 412 via the connection terminal T10 as the signal terminal. As a result, the IC chip receives the supply of power from the external device, and transmits and receives a signal to and from the external device via the antenna patterns 411, 412, and 461. The antenna patterns 411, 412, and 461 operate as a dipole antenna. Specifically, the antenna pattern 411 functions as one element of the dipole antenna using as a feeding point the connection to the connection terminal T9, and the antenna patterns 412 and 461 function as the other element of the dipole antenna using as a feeding point the via hole 452.

According to the sixth embodiment, the above-described RFID tag 400 permits any type of the independent dummy terminal IC package and the connection dummy terminal IC package to be used as the IC package 10c and versatility to be improved, in the same manner as in the fourth embodiment. When the antenna effective area is extended to under the IC package 10c, the IC chip makes it possible to have a longer distance capable of communication without increasing a size of the entire RFID tag 400.

While the above description of the sixth embodiment has assumed that the wiring layer L2 is formed on the upper surface of the substrate 20b, the sixth embodiment is not limited to that configuration. For example, the embodiment may allow the wiring layer L2 to be formed on the bottom surface of the substrate 20a. In this case, the antenna pattern 461 is formed on the bottom surface of the substrate 20a. Further, in this case, the RFID tag avoids the need to include the substrate 20b.

Seventh Embodiment

In the present embodiment, the RFID tag including a loop antenna using a configuration of the wiring pattern of the wiring layers L1 and L2 according to the fourth embodiment will be described.

FIGS. 16A, 16B, and 16C illustrate a configuration of the RFID tag according to a seventh embodiment. FIG. 16A is a plan view, FIG. 16B is a front view, and FIG. 16C is a bottom view. Further, FIGS. 17A and 17B illustrate shapes of the wiring patterns. FIG. 17A illustrates the wiring pattern of the first wiring layer (L1), and FIG. 17B illustrates the wiring pattern of the second wiring layer (L2). Further, FIGS. 18A and 18B are cross sectional views of the RFID tag according to the seventh embodiment. FIG. 18A is a cross sectional view of the RFID tag viewed from the direction of the arrows F-F in FIG. 16A, and FIG. 18B is a cross sectional view of the RFID tag viewed from the direction of the arrows G-G in FIG. 16A. In addition, when circuit components in FIGS. 16 to 18 are the same as those described in FIGS. 8 to 10, the same reference numerals are given to them.

The present embodiment provides the RFID tag 500 that includes, for example, three-layer laminated substrates 20a to 20c and in which the IC package 10c is mounted on the upper surface of the uppermost substrate 20a. The substrates 20a to 20c are made of the same insulating materials as those of the substrate 20 according to the first to third embodiments. The wiring layers L1, L2, L3, and L4 are formed over the upper surface of the substrate 20a, the surface between the substrates 20a and 20b, the surface between the substrates 20b and 20c, and the bottom surface of the substrate 20d, respectively.

For example, the present embodiment assumes that the wiring layer L2 is formed over the upper surface of the substrate 20b and a tabular wiring pattern such as an antenna pattern and a mounting pad is formed on the wiring layers L1, L2, and L4. Further, the present embodiment may allow a tabular electrically conductive body for constituting a part of the antenna to be provided also over a side surface of the substrates 20a to 20c.

The IC package 10c includes twelve connection terminals T1 to T12. According to the present embodiment, the connection terminals T9 and T10 serve as the signal terminals and the other connection terminals T1 to T8, T11, and T12 serve as the dummy terminals, in the same manner as in the fourth embodiment. Any type of the independent dummy terminal IC package and the connection dummy terminal IC package may be used as the IC package 10c.

On the wiring layers L1 and L2, the same antenna patterns, mounting pads, and via holes as those of the fourth embodiment are formed as the wiring pattern. Specifically, the antenna patterns 511, 512, 561, and 562 correspond to the antenna patterns 311, 312, 361, and 362 according to the fourth embodiment, respectively. The antenna patterns 511 and 561 are electrically connected to each other through the via holes 551, and the antenna patterns 512 and 562 are electrically connected to each other through the via holes 552. Note that one end of each antenna pattern 511 and 512 reaches an end in the long-side direction of the substrate 20a.

The mounting pads 521 and 522 contacting the signal terminals correspond to the mounting pads 321 and 322 according to the fourth embodiment, respectively. Further, the mounting pads 531 to 540 contacting the dummy terminals correspond to the mounting pads 331 to 340 contacting the dummy terminals according to the fourth embodiment, respectively. In addition, the mounting pads 531 to 540 contacting the dummy terminals are not essential constituents in the same manner as in the fourth embodiment.

When the IC package 10c is mounted on the intermediate region 21, the mounting pads 521 and 522 are electrically contacted with the connection terminals T9 and T10 as the signal terminals, respectively. When the IC package 10c is mounted on the intermediate region 21, the mounting pads 531 to 540 are electrically contacted with the connection terminals T1 to T8, T11, and T12 as the dummy terminals, respectively. Further, the mounting pad 521 and the antenna pattern 561 are connected to each other through the via hole 553, and the mounting pad 522 and the antenna pattern 562 are electrically connected to each other through the via hole 554.

According to the present embodiment, the tabular antenna pattern 571 is formed over the wiring layer L4. The antenna pattern 571 is formed over the region from one end to the other end in the long-side direction of the bottom surface of the substrate 20c. Further, the tabular antenna patterns 572 and 573 are formed over each side surface located in the long-side direction of the substrates 20a to 20c. The antenna patterns 572 and 573 are formed over the region from an upper end to a lower end in the thickness direction of the substrates 20a to 20c. One end of the antenna pattern 572 is electrically connected to the antenna pattern 511 of the wiring layer L1, and the other end of the antenna pattern 572 is electrically connected to the antenna pattern 571 of the wiring layer L4. On the other hand, one end of the antenna pattern 573 is electrically connected to the antenna pattern 512 of the wiring layer L1, and the other end of the antenna pattern 573 is electrically connected to the antenna pattern 571 of the wiring layer L4.

The antenna patterns 572 and 573 are made of the same electrically conductive body as that of each wiring pattern of the wiring layers L1, L2, and L4, such as copper and aluminum. The antenna pattern 571 may be formed over the entire bottom surface of the substrate 20c. Further, the antenna patterns 572 and 573 may be formed over the entire side surfaces located in the long-side direction of the substrates 20a to 20c.

For example, a copper foil is stuck over the entire surface of each one surface of the substrates 20a to 20c and then etched, thereby forming each wiring pattern of the wiring layers L1, L2, and L4. For example, after the antenna patterns 511 and 512, and 571 are formed over the substrates 20a and 20c, respectively, and the substrates 20a to 20c are laminated with each other, the antenna patterns 572 and 573 are formed over the side surfaces of the substrates 20a to 20c. Or alternatively, the antenna patterns 511, 512, and 571 to 573 may be formed, for example, using an integral tabular electrically conductive body and fixed around the laminated-together substrates 20a to 20c.

The above-described configuration permits the antenna patterns 511, 512, 561, 562, and 571 to 573 to operate as a loop antenna using as a feeding point the via holes 553 and 554. Further, the IC chip of the IC package 10c is electrically connected to both ends of the loop antenna via the connection terminals T9 and T10 as the signal terminals. As a result, the IC chip receives the supply of power from the external device, and transmits and receives a signal to and from the external device via the loop antenna.

According to the seventh embodiment, the RFID tag 500 permits any type of the independent dummy terminal IC package and the connection dummy terminal IC package to be used as the IC package 10c and versatility to be improved, in the same manner as in the fourth embodiment. Further, the end region of the loop antenna is formed over the wiring layer L2 different from the mounting surface of the IC package 10c, and the IC package 10c and the loop antenna are connected to each other through the via holes. This processing permits the effective area of the loop antenna to be extended to under the IC package 10c. Accordingly, the IC chip makes it possible to have a longer distance capable of communication without increasing a size of the entire RFID tag 500.

According to the seventh embodiment, the wiring pattern formed over the wiring layer L2 may be formed, for example, over any one of the bottom surface of the substrate 20a, the bottom surface of the substrate 20b, and the upper surface of the substrate 20c. While the above description of the seventh embodiment has assumed that the three-layer laminated substrates are used as an example, the seventh embodiment is not limited to that configuration. The above-described configuration of the loop antenna can be realized using two or more-layer laminated substrates including three or more wiring layers.

While the above description of the seventh embodiment has assumed the case of using the IC package in which two connection terminals provided on the same end side are used as the signal terminals, the seventh embodiment is not limited to that configuration. Alternatively, for example, the IC package in which connection terminals arranged at opposite ends serve as the signal terminals can be used. In this case, for example, the wiring patterns of the wiring layers L1 and L2 illustrated in FIGS. 11 and 12 may be used in place of the wiring patterns of the wiring layers L1 and L2 according to the seventh embodiment.

Eighth Embodiment

In the present embodiment, the RFID tag including a loop antenna using a configuration of the wiring patterns of the wiring layers L1 and L2 according to the sixth embodiment will be described.

FIGS. 19A, 19B, and 19C illustrate a configuration of the RFID tag according to an eighth embodiment. FIG. 19A is a plan view, FIG. 19B is a front view, and FIG. 19C is a bottom view. FIGS. 20A and 20B illustrate shapes of the wiring patterns. FIG. 20A illustrates the wiring pattern of the first wiring layer (L1), and FIG. 20B illustrates the wiring pattern of the second wiring layer (L2). Further, FIG. 21 is a cross sectional view of the RFID tag according to the eighth embodiment. FIG. 21 is a cross sectional view of the RFID tag viewed from the direction of the arrows H-H in FIG. 19A. When circuit components in FIGS. 19 to 21 are the same as those described in FIGS. 13 to 15 and FIGS. 16 to 18, the same reference numerals are given to them.

For example, the present embodiment provides the RFID tag 600 that includes the three-layer laminated substrates 20a to 20c, and in which the IC package 10c is mounted on the upper surface of the uppermost substrate 20a, in the same manner as in the seventh embodiment. According to the present embodiment, in particular, the tabular wiring patterns are formed over the wiring layers L1, L2, and L4 using an electrically conductive body. Further, the tabular wiring patterns for constituting a part of the antenna pattern are formed also over the side surfaces of the substrates 20a to 20c using an electrically conductive body.

The IC package 10c includes twelve connection terminals T1 to T12. The present embodiment provides the RFID tag 600 in which the connection terminals T9 and T10 serve as the signal terminals and the other connection terminals T1 to T8, T11, and T12 serve as the dummy terminals, in the same manner as in the fourth embodiment. Any type of the independent dummy terminal IC package and the connection dummy terminal IC package may be used as the IC package 10c.

The same antenna patterns, mounting pads, and via holes as those of the sixth embodiment are formed on the wiring layers L1 and L2 as the wiring patterns. Specifically, the antenna patterns 611, 612, and 661 correspond to the antenna patterns 411, 412, and 461 according to the sixth embodiment, respectively. A convex portion 611a is formed at the end of the intermediate region 22 side of the antenna pattern 611, and corresponds to the convex portion 411a of the sixth embodiment. Further, the antenna patterns 612 and 661 are electrically connected to each other through the via hole 651. Note that each end of the antenna patterns 611 and 612 reaches the end in the long-side direction of the substrate 20a.

The mounting pad 621 contacting the signal terminal corresponds to the mounting pad 421 according to the sixth embodiment. Further, the mounting pads 631 to 640 contacting the dummy terminals correspond to the mounting pads 431 to 440 according to the sixth embodiment, respectively. The convex portion 611a of the antenna pattern 611 is arranged between the mounting pads 621 and 638. The mounting pads 631 to 640 contacting the dummy terminals are not essential constituents in the same manner as in the sixth embodiment.

When the IC package 10c is mounted on the intermediate region 22, the convex portion 611a of the antenna pattern 611 is electrically connected to the connection terminal T9 as the signal terminal, and the mounting pad 621 is electrically contacted with the connection terminal T10 as the signal terminal. On the other hand, when the IC package 10c is mounted on the intermediate region 22, the mounting pads 631 to 640 are electrically contacted with the connection terminals T1 to T8, T11, and T12 as the dummy terminals, respectively. Further, the mounting pad 621 and the antenna pattern 661 are electrically connected to each other through the via hole 652.

According to the present embodiment, a tabular antenna pattern 671 is formed over the wiring layer L4. Further, the tabular antenna pattern 672 and 673 are formed over the side surfaces located in the long-side direction of the substrates 20a to 20c. These antenna patterns 671 to 673 correspond to the antenna patterns 571 to 573 according to the seventh embodiment. One end of the antenna pattern 672 is electrically connected to the antenna pattern 611 of the wiring layer L1, and the other end of the antenna pattern 672 is electrically connected to the antenna pattern 671 of the wiring layer L4. On the other hand, one end of the antenna pattern 673 is electrically connected to the antenna pattern 612 of the wiring layer L1, and the other end of the antenna pattern 673 is electrically connected to the antenna pattern 671 of the wiring layer L4.

The above-described configuration permits the antenna patterns 611, 612, 661, and 671 to 673 to operate as a loop antenna using as a feeding point each of the via hole 652 and the connection between the connection terminal T9 and the convex portion 611a. Further, the IC chip of the IC package 10c is electrically connected to both ends of the loop antenna via the connection terminals T9 and T10 as the signal terminals. As a result, the IC chip receives the supply of power from the external device, and transmits and receives a signal to and from the external device via the loop antenna.

According to the eighth embodiment, the above-described RFID tag 600 permits any type of the independent dummy terminal IC package and the connection dummy terminal IC package to be used as the IC package 10c, and versatility to be improved, in the same manner as in the sixth embodiment. Further, one end region of the loop antenna is formed over the wiring layer L2 different from a mounting surface of the IC package 10c, and the IC package 10c and the loop antenna are connected to each other through the via hole. This processing permits the effective area of the loop antenna to be extended to under the IC package 10c. Accordingly, the IC chip makes it possible to have a longer distance capable of communication without increasing a size of the entire RFID tag 600.

According to the eighth embodiment, the wiring pattern formed over the wiring layer L2 may be formed, for example, over any one of the bottom surface of the substrate 20a, the bottom surface of the substrate 20b, and the upper surface of the substrate 20c. While the above description of the eighth embodiment has assumed that the three-layer laminated substrates are used as an example, the eighth embodiment is not limited to that configuration. Alternatively, the above-described configuration of the loop antenna can be realized using two or more-layer laminated substrates including three or more wiring layers.

Ninth Embodiment

In the present embodiment, a configuration example of the RFID tag including a flat patch antenna will be described.

FIGS. 22A, 22B, and 22C illustrate a configuration of the RFID tag according to a ninth embodiment. FIG. 22A is a plan view, FIG. 22B is a front view, and FIG. 22C is a bottom view. Further, FIGS. 23A and 23B illustrate shapes of the wiring patterns. FIG. 23A illustrates a wiring pattern of the first wiring layer (L1), and FIG. 23B illustrates a wiring pattern of the second wiring layer (L2). Further, FIG. 24 is a cross sectional view of the RFID tag according to the ninth embodiment. FIG. 24 is a cross sectional view of the RFID tag viewed from the direction of the arrows I-I in FIG. 22. In addition, when circuit components in FIGS. 19 to 21 are the same as those described in FIGS. 13 to 18, the same reference numerals are given to them.

For example, the present embodiment provides the RFID tag 700 that includes the three-layer laminated substrates 20d to 20f, and in which the IC package 10c is mounted on the upper surface of the uppermost substrate 20a. The substrates 20d to 20f are formed using the same insulating materials as those of the substrates 20a to 20c according to the seventh and eighth embodiments. The wiring layers L1, L2, L3, and L4 are formed over the upper surface of the substrate 20d, the surface between the substrates 20d and 20e, the surface between the substrates 20e and 20f, and the bottom surface of the substrate 20f.

For example, the present embodiment assumes that the wiring layer L2 is formed over the upper surface of the substrate 20e and tabular wiring patterns such as antenna patterns and mounting pads are formed over the wiring layers L1, L2, and L4. Further, the present embodiment assumes that the tabular wiring pattern is formed also over a part of the side surface of the substrates 20d to 20f using an electrically conductive body.

The IC package 10c includes twelve connection terminals T1 to T12. According to the present embodiment, the connection terminals T9 and T10 serve as the signal terminals and the other connection terminals T1 to T8, T11, and T12 serve as the dummy terminals, in the same manner as in the seventh embodiment. Any type of the independent dummy terminal IC package and the connection dummy terminal IC package may be used as the IC package 10c.

An antenna pattern 711 and mounting pads 721 to 732 are formed on the wiring layer L1 as the wiring pattern. A package mounting region 23 for mounting the IC package 10c is provided on one end side of the upper surface of the substrate 20d, and the antenna pattern 711 is formed over a region except the package mounting region 23. The antenna pattern 711 has a shape of rectangle or square, and via holes 741 for electrically connecting to the wiring layer L2 are formed at one end of the antenna pattern 711.

The mounting pads 721 to 732 are formed on the package mounting region 23. The mounting pads 721 to 726 are arranged in parallel on the formation region side of the antenna pattern 711, and the mounting pads 727 to 732 are arranged in parallel near the end of the substrate 20d of the other side of the formation region. When the IC package 10c is mounted on the package mounting region 23, the mounting pads 721 to 732 are electrically contacted with the connection terminals T1 to T12, respectively. Specifically, the mounting pads 729 and 730 are electrically contacted with the signal terminals, and the mounting pads 721 to 728, 731, and 732 are electrically contacted with the dummy terminals. The mounting pads 721 to 728, 731, and 732 are used, for example, as ground wiring lines of the IC chip. In addition, these mounting pads 721 to 728, 731, and 732 are not essential constituents in the same manner as in the above-described fourth embodiment.

The mounting pad 729 is extended up to the end of the substrate 20d and electrically connected to the connection pattern 729a formed in a planar shape over the side surface of the substrates 20d to 20f. Further, the via hole 742 for electrically connecting to the wiring layer L2 is formed through the mounting pad 730.

The antenna pattern 712 is formed over the wiring layer L2 as the wiring pattern. The antenna pattern 712 has a shape of rectangle or square, and is formed so as to include the formation region of the via holes 741 and 742. The antenna pattern 712 is electrically connected to the antenna pattern 711 of the wiring layer L1 through the via holes 741, and is electrically connected to the mounting pad 730 of the wiring layer L1 through the via hole 742.

A tabular ground pattern 713 having a ground potential is formed over the entire wiring layer L4. The ground pattern 713 is electrically connected to the mounting pad 729 of the wiring layer L1 via the connection pattern 729a formed over the side surface of the substrates 20d to 20f. When connected to the connection pattern 729a, the ground pattern 713 may not be necessarily formed over the entire wiring layer L4.

For example, the mounting pad 729 and the ground pattern 713 are respectively formed on the substrates 20d and 20f and the substrates 20d to 20f are laminated together. Then, the connection pattern 729a is formed over the side surface of the substrates 20d to 20f. Alternatively, the connection pattern 729a may be formed integrally with, for example, the mounting pad 729, or the mounting pad 729 and the ground pattern 713, and then fixed around the laminated substrates 20d to 20f. Further, the mounting pad 729 and the ground pattern 713 are electrically connected to each other, for example, through the via hole in place of the connection pattern 729a.

The above-described configuration permits the IC chip of the IC package 10c to be electrically connected to the ground pattern 713 of the wiring layer L4 via the connection terminal T9, the mounting pad 729, and the connection pattern 729a. On the other hand, the antenna patterns 711 and 712 electrically connected to each other through the via holes 741 operate as a flat patch antenna using as a feeding point the via hole 742. Further, the IC chip of the IC package 10c is electrically connected to the flat patch antenna via the connection terminal T10, the mounting pad 730, and the via hole 742. As a result, the IC chip receives the supply of power from the external device, and transmits and receives a signal to and from the external device via the flat patch antenna.

According to the ninth embodiment, the proposed RFID tag 700 permits any type of the independent dummy terminal IC package and the connection dummy terminal IC package to be used as the IC package 10c, and versatility to be improved. Further, a part of the region of the flat patch antenna is formed over the wiring layer L2 different from a mounting surface of the IC package 10c, and the IC package 10c and an end of the flat patch antenna are connected to each other through the via hole. This processing permits the effective area of the flat patch antenna to be extended to under the IC package 10c. Accordingly, the IC chip makes it possible to have a longer distance capable of communication without increasing a size of the entire RFID tag 700.

According to the ninth embodiment, the wiring pattern formed over the wiring layer L2 may be formed, for example, over any one of the bottom surface of the substrate 20d, the bottom surface of the substrate 20e, and the upper surface of the substrate 20f. While the above description of the ninth embodiment has assumed that three-layer laminated substrates are used as an example, the above-described configuration of the flat patch antenna can be realized using two or more-layer laminated substrates including three or more wiring layers.

As can be seen from various embodiments discussed above, the proposed RFID tag permits the antenna effective area to be extended to under the semiconductor package.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions and alterations could be made hereto without departing from the spirit and scope of the invention.

What is claimed is:

1. An RFID tag, comprising:
a substrate;
a semiconductor package mounted on the substrate, the semiconductor package including a semiconductor chip encapsulated therein and a plurality of connection terminals thereon, the plurality of connection terminals including signal terminals and dummy terminals; and
an antenna pattern formed on the substrate and electrically connected to the signal terminals;
wherein the antenna pattern is extended so as to overlap vertically with at least a part of a mounting region of the semiconductor package and a part of a mounting region of the dummy terminals.

2. The RFID tag according to claim 1, wherein:
the semiconductor package includes a first signal terminal and a second signal terminal as the signal terminals;
the antenna pattern includes:
a first pattern that contacts the first signal terminal, and
a second pattern that is formed separately from the first pattern on a same surface as the first pattern of the substrate, and that contacts the second signal terminal;
the first pattern functions as one element of a dipole antenna; and
the second pattern functions as another element of the dipole antenna.

3. The RFID tag according to claim 2, wherein:
the dummy terminals are electrically insulated from an internal circuit of the semiconductor package, and joined with either one of the first pattern and the second pattern.

4. The RFID tag according to claim 1, wherein:
the dummy terminals are provided on the semiconductor package in a state of extending outward from at least two facing sides of a package outer casing in which the semiconductor chip is encapsulated.

5. An RFID tag, comprising:
a substrate including a first and second wiring layer, the first wiring layer being formed over an upper surface of the substrate;
a semiconductor package mounted on the upper surface of the substrate, the semiconductor package including a semiconductor chip encapsulated therein and a plurality of connection terminals thereon, the plurality of connection terminals including signal terminals; and
an antenna pattern formed on the substrate and electrically connected to the signal terminals;
wherein the antenna pattern includes:
a first pattern that is formed over a region of the first wiring layer except a region on which the semiconductor package is mounted; and
a second pattern that is formed over a region of the second wiring layer which is placed partly under the semiconductor package, and that is electrically connected to each of the first pattern and the signal terminals through via holes.

6. The RFID tag according to claim 5, wherein:
electrically conductive pads that contact the signal terminals when the semiconductor package is mounted are formed on the first wiring layer, and the electrically conductive pads and the second pattern are electrically connected to each other through via holes.

7. The RFID tag according to claim 5, wherein:
the semiconductor package includes a first signal terminal and a second signal terminal as the signal terminals; and
the antenna pattern includes:
a third pattern that is formed over a region of the first wiring layer on an opposite side of the region on which the semiconductor package is mounted from the first pattern,
the second pattern that is formed over a region of the second wiring layer which is placed partly under the first pattern and partly under the semiconductor package, and that is electrically connected to each of the first pattern and the first signal terminal through via holes, and
a fourth pattern that is formed over a region of the second wiring layer which is placed partly under the third pattern and partly under the semiconductor package, and that is electrically connected to each of the third pattern and the second signal terminal through via holes and separated from the second pattern.

8. The RFID tag according to claim 7, wherein:
the first pattern and the second pattern function as one element of a dipole antenna, and the third pattern and the fourth pattern function as another element of the dipole antenna.

9. The RFID tag according to claim 7, wherein:
a first electrically conductive pad and second electrically conductive pad that contact the first signal terminal and the second signal terminal, respectively, when the semiconductor package is mounted are formed on the first wiring layer, the first electrically conductive pad and the second pattern are electrically connected to each other through a via hole, and the second electrically conductive pad and the fourth pattern are electrically connected to each other through a via hole.

10. The RFID tag according to claim 7, wherein:
the antenna pattern includes:
a fifth pattern that is formed over a third wiring layer formed on an opposite side of the second wiring layer from the first wiring layer;
a sixth pattern that is formed in a planar shape over a first end surface of the substrate located in a direction toward the first pattern from the region on which the semiconductor package is mounted, and that electrically connects the first pattern and the fifth pattern; and
a seventh pattern that is formed in a planar shape over a second end surface of the substrate located in a direction toward the third pattern from the region on which the semiconductor package is mounted, and that electrically connects the third pattern and the fifth pattern; and
the first to seventh patterns function as a loop antenna.

11. The RFID tag according to claim 5, wherein:
the semiconductor package includes a first signal terminal and a second signal terminal as the signal terminals the antenna pattern includes, in a region of the first wiring layer, a third pattern having a first region that is formed on an opposite side of a region on which the semiconductor package is mounted and a second region that is projected from an end of the first region of a region side on which the semiconductor package is mounted, the second region contacting only the first signal terminal among the connection terminals; and the second pattern is electrically connected to the second signal terminal through a via hole.

12. The RFID tag according to claim 11, wherein:
the first region of the third pattern functions as one element of a dipole antenna, and the first pattern and the second pattern function as another element of the dipole antenna.

13. The RFID tag according to claim 11, wherein:
an electrically conductive pad that contacts the second signal terminal when the semiconductor package is mounted is formed on the first wiring layer, and the electrically conductive pad and the second pattern are electrically connected to each other through a via hole.

14. The RFID tag according to claim 11, wherein:
a first connection terminal group including the first signal terminal and the second signal terminal among the connection terminals is provided on one end of the semiconductor package, and a second connection terminal group except the first connection terminal group among the connection terminals is provided on another end of the semiconductor package; and the semiconductor package is mounted on the first wiring layer of the substrate such that the one end faces a direction in which the third pattern is formed and the other end faces a direction in which the first pattern is formed.

15. The RFID tag according to claim 11, wherein:
the antenna pattern includes:
a fourth pattern that is formed over a third wiring layer formed on an opposite side of the second wiring layer from the first wiring layer,
a fifth pattern that is formed in a planer shape over an end surface of the substrates located in a direction in which the first pattern is formed from a region on which the semiconductor package is mounted, and that electrically connects the first pattern and the fourth pattern, and
a sixth pattern that is formed in a planar shape over an end surface of the substrates located in a direction toward the third pattern from the region on which the semiconductor package is mounted, and that electrically connects the third pattern and the fourth pattern; and the first to sixth patterns function as a loop antenna.

16. The RFID tag according to claim 5, wherein:
the semiconductor package includes a first signal terminal and a second signal terminal as the signal terminals;
the antenna pattern includes:
a third pattern that is formed over a third wiring layer formed on an opposite side of the second wiring layer from the first wiring layer, and that is electrically connected to the first signal terminal through via holes or an electrically conductive pattern formed over a side surface of the substrate;

the second pattern is electrically connected to the second signal terminal through a via hole; and a potential of the third pattern is equal to ground, and the first pattern and the second pattern function as a flat patch antenna.

* * * * *